US011089273B2

(12) United States Patent
Tomono et al.

(10) Patent No.: US 11,089,273 B2
(45) Date of Patent: Aug. 10, 2021

(54) IMAGE DISPLAY SYSTEM AND CONTROL METHOD FOR IMAGE DISPLAY SYSTEM

(71) Applicant: SEIKO EPSON CORPORATION, Tokyo (JP)

(72) Inventors: Mitsunori Tomono, Shimosuwa-machi (JP); Yasuhiro Nakamura, Matsumoto (JP); Takanori Shoji, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/857,624

(22) Filed: Apr. 24, 2020

(65) Prior Publication Data
US 2020/0344452 A1    Oct. 29, 2020

(30) Foreign Application Priority Data

Apr. 25, 2019  (JP) .............................. JP2019-083769
Sep. 3, 2019   (JP) .............................. JP2019-160193

(51) Int. Cl.
*H04N 9/31* (2006.01)
*H04N 21/422* (2011.01)

(52) U.S. Cl.
CPC ....... *H04N 9/312* (2013.01); *H04N 21/42204* (2013.01); *H04N 21/4221* (2013.01); *H04N 21/42221* (2013.01)

(58) Field of Classification Search
CPC ............. H04N 9/312; H04N 21/42204; H04N 21/4221; H04N 21/42221
See application file for complete search history.

(56) References Cited

U.S. PATENT DOCUMENTS

| 8,850,356 | B2 * | 9/2014 | Takizawa | ......... H04N 21/42204 715/810 |
| 9,215,394 | B2 * | 12/2015 | Barnett | ................. H04L 12/282 |
| 9,258,508 | B2 * | 2/2016 | Hardin | ............. H04N 21/42208 |
| 9,357,243 | B2 * | 5/2016 | Green | ................. H04N 21/2368 |
| 9,357,252 | B2 * | 5/2016 | Kohanek | .......... H04N 21/43615 |
| 9,390,618 | B2 * | 7/2016 | Ryu | .................... H04L 12/2814 |

(Continued)

FOREIGN PATENT DOCUMENTS

| JP | 2010-004496 A | 1/2010 |
| JP | 2010-062658 A | 3/2010 |

(Continued)

*Primary Examiner* — Brian P Yenke
(74) *Attorney, Agent, or Firm* — Oliff PLC

(57) ABSTRACT

A remote controller respectively transmits an infrared operation signal to a projector, a Bluetooth operation signal to an image supply apparatus, and both the operation signals when respective operation keys of first, second, and third key groups are operated. When a menu key is operated, the projector performs control for displaying a menu image and output of an operation restricting command to the image supply apparatus, and, when a predetermined condition is satisfied after the output of the operation restricting command, performs control for ending the display of the menu image and output of a restriction releasing command to the image supply apparatus. The image supply apparatus stops control corresponding to an operation signal corresponding to the third key group from when the operation restricting command is input until when the restriction releasing command is input.

8 Claims, 14 Drawing Sheets

(56) References Cited

U.S. PATENT DOCUMENTS

| | | | |
|---|---|---|---|
| 9,544,633 B2* | 1/2017 | Lee | H04N 21/42221 |
| 9,661,255 B2* | 5/2017 | Keum | H04N 21/43615 |
| 10,553,105 B2* | 2/2020 | Yoon | H04N 21/42204 |
| 2009/0023499 A1 | 1/2009 | Mao | |
| 2011/0225264 A1 | 9/2011 | Serar | |
| 2014/0080419 A1 | 3/2014 | Ko et al. | |
| 2015/0020098 A1 | 1/2015 | Matsuda | |
| 2015/0046948 A1* | 2/2015 | Jung | H04N 21/42224 725/43 |
| 2015/0296245 A1* | 10/2015 | Toh | G08C 23/04 725/80 |
| 2016/0171881 A1* | 6/2016 | Thompson | G08C 17/00 725/38 |
| 2017/0132913 A1* | 5/2017 | Hong | H04N 21/42208 |
| 2017/0150227 A1* | 5/2017 | Kim | H04N 21/47815 |
| 2020/0107065 A1* | 4/2020 | Kim | H04N 21/42212 |
| 2020/0220621 A1* | 7/2020 | Lee | H04B 10/1143 |
| 2020/0288188 A1* | 9/2020 | Kim | H04N 21/4126 |

FOREIGN PATENT DOCUMENTS

| | | |
|---|---|---|
| JP | 2010-533919 A | 10/2010 |
| JP | 2012-124866 A | 6/2012 |
| JP | 2013-090243 A | 5/2013 |
| JP | 2014-059873 A | 4/2014 |
| JP | 2015-019238 A | 1/2015 |
| JP | 2015-072702 A | 4/2015 |

* cited by examiner

IMAGE DISPLAY SYSTEM AND CONTROL METHOD FOR IMAGE DISPLAY SYSTEM

The present application is based on, and claims priority from JP Application Serial Numbers 2019-083769 and 2019-160193, filed Apr. 25, 2019 and Sep. 3, 2019, respectively, the disclosure of which is hereby incorporated by reference herein in its entirety.

BACKGROUND

1. Technical Field

The present disclosure relates to an image display system and a control method for the image display system.

2. Related Art

As an example of an image supply apparatus that supplies image information to an image display apparatus, JP A-2015-19238 (Patent Literature 1) describes a set-top box that causes the image display apparatus to display contents acquired via the Internet or the like. The set-top box is capable of performing communication by Bluetooth (registered trademark). A user can remotely operate the set-top box using a remote controller that transmits a Bluetooth signal.

On the other hand, in general, a remote controller that transmits an infrared signal is used for remote operation for an image display apparatus such as a projector. Accordingly, when the image supply apparatus that can be operated by the Bluetooth signal is coupled to the image display apparatus, which can be operated by the infrared signal, and used, it is desirable that the image supply apparatus and the image display apparatus can be operated by one remote controller adapted to both of the infrared signal and the Bluetooth signal.

However, when an operation key for transmitting the infrared signal and an operation key for transmitting the Bluetooth signal are disposed in one remote controller, since the number of operation keys increases, operability of the remote controller is deteriorated. Accordingly, if operation keys that can be used in both of the image supply apparatus and the image display apparatus are collected into one common operation key and both of the infrared signal and the Bluetooth signal are transmitted when the common operation key is operated, it is possible to suppress the increase in the operation keys. However, in such a configuration, when the common operation key is operated to operate the image display apparatus, it is likely that the image supply apparatus performs unintended operation.

SUMMARY

An image display system according to an aspect of the present disclosure is an image display system including: an image supply apparatus configured to supply image information; an image display apparatus configured to display an image based on the image information supplied from the image supply apparatus; and a remote controller configured to remotely operate the image supply apparatus and the image display apparatus. The remote controller includes: a first operation key, a second operation key, and a third operation key; a first transmitting section configured to transmit a first operation signal; a second transmitting section configured to transmit a second operation signal in a communication scheme different from a communication scheme for the first operation signal; and a remote-controller control section configured to, when the first operation key is operated, cause the first transmitting section to transmit the first operation signal, when the second operation key is operated, cause the second transmitting section to transmit the second operation signal, and, when the third operation key is operated, cause the first transmitting section to transmit the first operation signal and cause the second transmitting section to transmit the second operation signal. The image display apparatus includes: a first input and output section coupled to the image supply apparatus; a first receiving section configured to receive the first operation signal; and a first control section configured to perform control corresponding to the first operation signal received by the first receiving section. The image supply apparatus includes: a second input and output section coupled to the image display apparatus; a second receiving section configured to receive the second operation signal; and a second control section configured to perform control corresponding to the second operation signal received by the second receiving section. The first control section performs, when a condition for starting first operation is satisfied, control for starting the first operation and output of a first command to the image supply apparatus and performs, when a condition for ending the first operation is satisfied after the first control section outputs the first command, control for ending the first operation and output of a second command to the image supply apparatus. The second control section stops, from when the first command is input until when the second command is input, control corresponding to the second operation signal transmitted when the third operation key is operated.

In the image display system, the condition for starting the first operation may be a condition that the first operation signal received by the first receiving section indicates the start of the first operation.

In the image display system, the condition for ending the first operation may be a condition that the first operation signal received by the first receiving section indicates the end of the first operation.

In the image display system, the condition for ending the first operation may be a condition that a time in which the first operation signal is not received by the first receiving section reaches a predetermined time.

In the image display system, the first operation may be display of a menu image for performing setting of the image display apparatus.

In the image display system, the first operation may be display of an image including a message indicating a state of the image display apparatus.

In the image display system, the first operation signal may be an infrared operation signal, and the second operation signal may be a Bluetooth operation signal.

A control method for an image display system according to an aspect of the present disclosure is a control method for an image display system including: an image supply apparatus configured to supply image information; an image display apparatus configured to display an image based on the image information supplied from the image supply apparatus; and a remote controller configured to remotely operate the image supply apparatus and the image display apparatus, the control method including: the remote controller transmitting a first operation signal when a first operation key included in the remote controller is operated; the remote controller transmitting a second operation signal in a communication scheme different from a communication scheme for the first operation signal when a second operation key included in the remote controller is operated; the remote controller performing the transmission of the first operation signal and the transmission of the second operation signal when a third operation key included in the remote controller is operated; the image display apparatus receiving the first operation signal and performing control corresponding to the first operation signal; the image supply apparatus receiving the second operation signal and performing control corresponding to the second operation signal; the image display apparatus performing control for starting the first operation and output of a first command to the image supply apparatus when a condition for starting the first operation is satisfied; the image display apparatus performing control for ending the first operation and output of a second command to the image supply apparatus when a condition for ending the first operation is satisfied after the first command is output; and the image supply apparatus stopping, from when the first command is input until when the second command is input, control corresponding to the second operation signal transmitted when the third operation key is operated.

DESCRIPTION OF EXEMPLARY EMBODIMENTS

An image display system in an embodiment is explained below with reference to the drawings.

Figure 1:
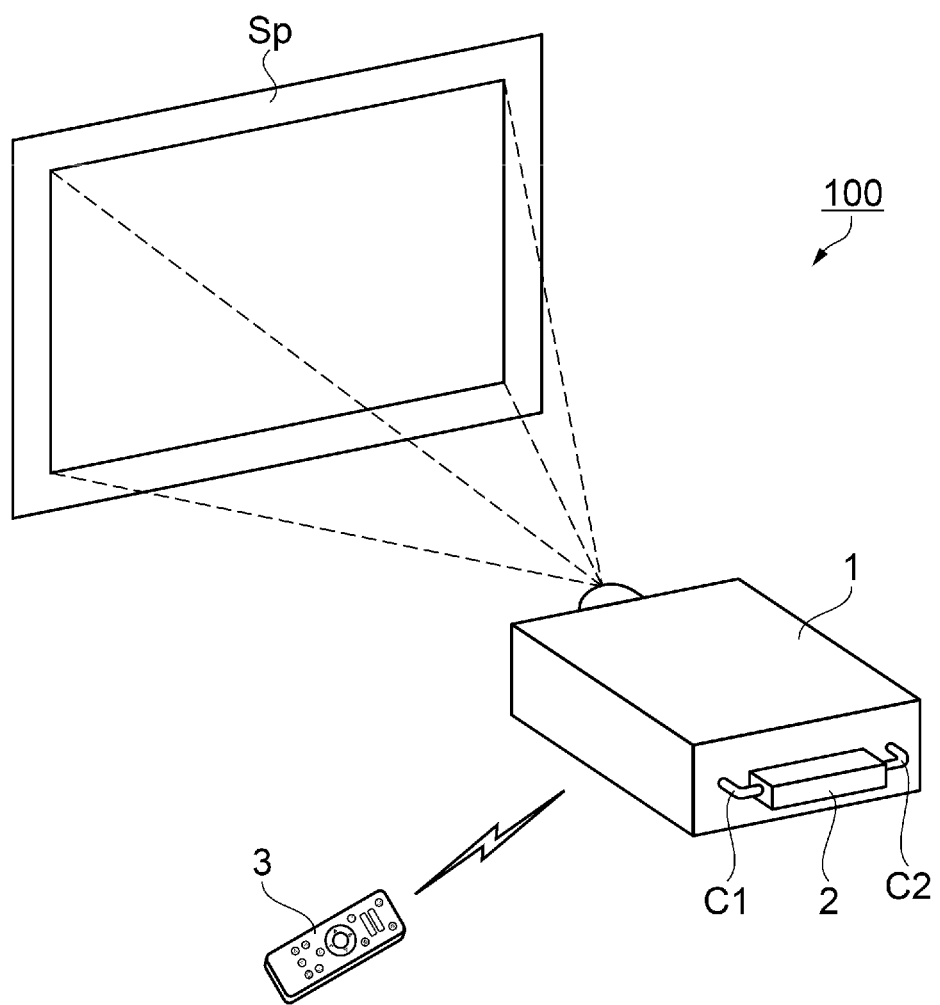
FIG. 1 is a schematic configuration diagram showing the configuration of an image display system.

FIG. 1 is a schematic configuration diagram showing the configuration of an image display system 100 in this embodiment.

As shown in FIG. 1, the image display system 100 includes a projector 1 functioning as the image display apparatus, an image supply apparatus 2, and a remote controller 3.

The projector 1 projects an image based on image information supplied from the image supply apparatus 2 onto a projection surface Sp and displays the image. The image supply apparatus 2 is, in this embodiment, a small set-top box also called streaming media player. The image supply apparatus 2 is coupled to a network NW (see FIG. 2) such as the Internet. The image supply apparatus 2 receives streaming information of contents distributed via the network NW by a content distribution service and supplies image information included in the streaming information to the projector 1. In the following explanation, an image based on the image information supplied from the image supply apparatus 2 to the projector 1 is described as "supply image" as well. An image representing the contents in the supply image is described as "content image" as well.

The image supply apparatus 2 in this embodiment is coupled to the projector 1 via a cable C1 for supplying image information to the projector 1 and a cable C2 for receiving supply of electric power from the projector 1. The electric power to the image supply apparatus 2 may be supplied from a power supply other than the projector 1 such as a commercial power supply.

The remote controller 3 includes a plurality of operation keys operated by a user. The remote controller 3 in this embodiment can transmit two operation signals in different communication schemes. Specifically, the remote controller 3 is capable of transmitting an infrared operation signal and an operation signal conforming to Bluetooth (registered trademark), which is a short range wireless communication standard. The user can remotely operate both of the projector 1 and the image supply apparatus 2 with the remote controller 3.

Figure 2:
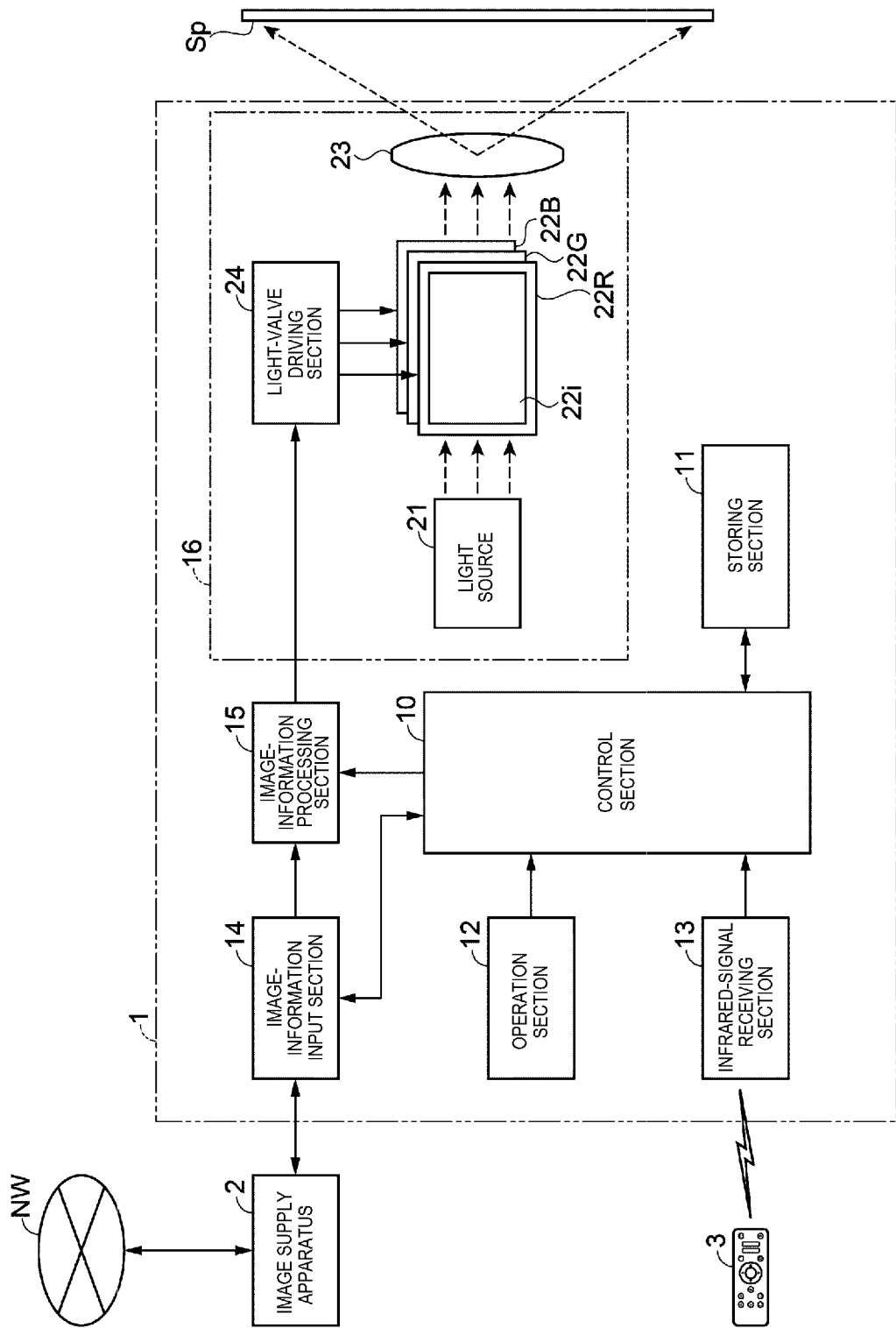
FIG. 2 is a block diagram showing a schematic configuration of a projector.

FIG. 2 is a block diagram showing a schematic configuration of the projector 1.

As shown in FIG. 2, the projector 1 includes a control section 10 functioning as the first control section, a storing section 11, an operation section 12, an infrared-signal receiving section 13 functioning as the first receiving section, an image-information input section 14 functioning as the first input and output section, an image-information processing section 15, and an image projecting section 16 functioning as the display section. Besides the components described above, the projector 1 can include, for example, a power supply circuit that converts electric power of AC 100V or the like of the commercial power supply into direct-current power having a predetermined voltage and supplies the direct-current power to the sections, a sound-information processing section that processes sound information, and a sound output section such as a speaker that outputs sound based on the sound information. In FIG. 2, these components are omitted.

The control section 10 includes one or a plurality of processors. The control section 10 operates according to a control program stored in the storing section 11 to thereby collectively control the operation of the projector 1.

The storing section 11 includes a RAM (Random Access Memory), which is a volatile memory, and a ROM (Read Only Memory), which is a nonvolatile memory. The RAM is used for temporary storage of various data and the like. The ROM stores a control program, control data, and the like for controlling the operation of the projector 1.

The operation section 12 includes a plurality of operation keys for the user to give various instructions to the projector 1. The operation keys included in the operation section 12 include a power key for switching ON and OFF of a power supply, a menu key for displaying a menu image Pm (see FIG. 9) explained below, a direction key used for selection or the like of an item in the menu image Pm, and a determination key for deciding the selected item. When the user operates the various operation keys of the operation section 12, the operation section 12 outputs an operation signal corresponding to content of the operation by the user to the control section 10. As explained below, these operation keys are included the remote controller 3 as well. It is possible to perform remote operation using the remote controller 3 instead of the operation section 12.

The infrared-signal receiving section 13 includes a light receiving element, a decoder, and the like, which are not shown in FIG. 2. The infrared-signal receiving section receives and decodes an infrared operation signal transmitted from the remote controller 3 and communicates the operation signal to the control section 10.

The image-information input section 14 includes a connection terminal, an interface circuit, and the like, which are not shown in FIG. 2. The image supply apparatus 2 is coupled to the image-information input section 14 via the connection terminal. The image-information input section 14 in this embodiment includes, as the connection terminal, an HDMI terminal conforming to HDMI (registered trademark) (High Definition Multimedia Interface). The image-information input section 14 receives supply of image information corresponding to the HDMI from the image supply apparatus 2. The image-information input section 14 converts the image information supplied from the image supply apparatus 2 into a form processible by the image-information processing section 15 and outputs the image information to the image-information processing section 15. The image-information input section 14 relays input and output of control information by a function called CEC (Consumer Electronics Control) of the HDMI. Accordingly, the control section 10 can perform input and output of control information between the control section 10 and the image supply apparatus 2 via the image-information input section 14.

The image-information processing section 15 applies, based on the control by the control section 10, various kinds of processing to the image information input from the image-information input section 14 and outputs the image information after the processing to a light-valve driving section 24 of the image projecting section 16. The image-information processing section 15 executes, according to necessity, for example, processing for adjusting image quality such as brightness and contrast and processing for superimposing the menu image Pm and an OSD (On Screen Display) image such as various messages on a part or the entire supply image. The image-information processing section 15 may be configured by one or a plurality of processors or the like or may be configured by an exclusive processing device such as an ASIC (Application Specific Integrated Circuit) or an FPGA (Field Programmable Gate Array).

The image projecting section 16 includes a light source 21, three liquid crystal light valves 22R, 22G, and 22B functioning as light modulating devices, a projection optical system 23, and a light-valve driving section 24. The image projecting section 16 modulates light emitted from the light source 21 with the liquid crystal light valves 22R, 22G, and 22B to form image light and projects the image light from the projection optical system 23 configured by a projection lens or the like to display an image on the projection surface Sp.

The light source 21 includes a discharge-type light source lamp such as an ultra-high pressure mercury lamp or a metal halide lamp or a solid-state light source such as a light emitting diode or a semiconductor laser. Light emitted from the light source 21 is converted into light having a substantially uniform luminance distribution by a not-shown integrator optical system, separated into color light components of red, green, and blue, which are three primary colors of light, by a not-shown color separation optical system, and thereafter respectively made incident on the liquid crystal light valves 22R, 22G, and 22B.

The liquid crystal light valves 22R, 22G, and 22B are configured by transmission-type liquid crystal panels or the like, in each of which liquid crystal is encapsulated between a pair of transparent substrates. In the liquid crystal panels, rectangular image forming regions 22$i$ formed by pluralities of pixels arrayed in a matrix shape are formed. A driving voltage can be applied to the liquid crystal for each of the pixels.

The light-valve driving section 24 forms images in the image forming regions 22$i$ of the liquid crystal light valves 22R, 22G, and 22B. Specifically, the light-valve driving section 24 applies a driving voltage corresponding to image information, which is input from the image-information processing section 15, to the pixels in the image forming regions 22$i$ and sets the pixels to light transmittance corresponding to the image information. Light emitted from the light source 21 is transmitted through the image forming regions 22$i$ of the liquid crystal light valves 22R, 22G, and 22B to be modulated for each of the pixels. Image lights corresponding to the image information are formed for each of the color lights. The formed color image lights are combined by a not-shown color combination optical system for each of the pixels to be image light representing a color image. The image light is enlarged and projected onto the projection surface Sp by the projection optical system 23. As a result, an image corresponding to the image information input from the image-information processing section 15 is displayed on the projection surface Sp.

Figure 3:
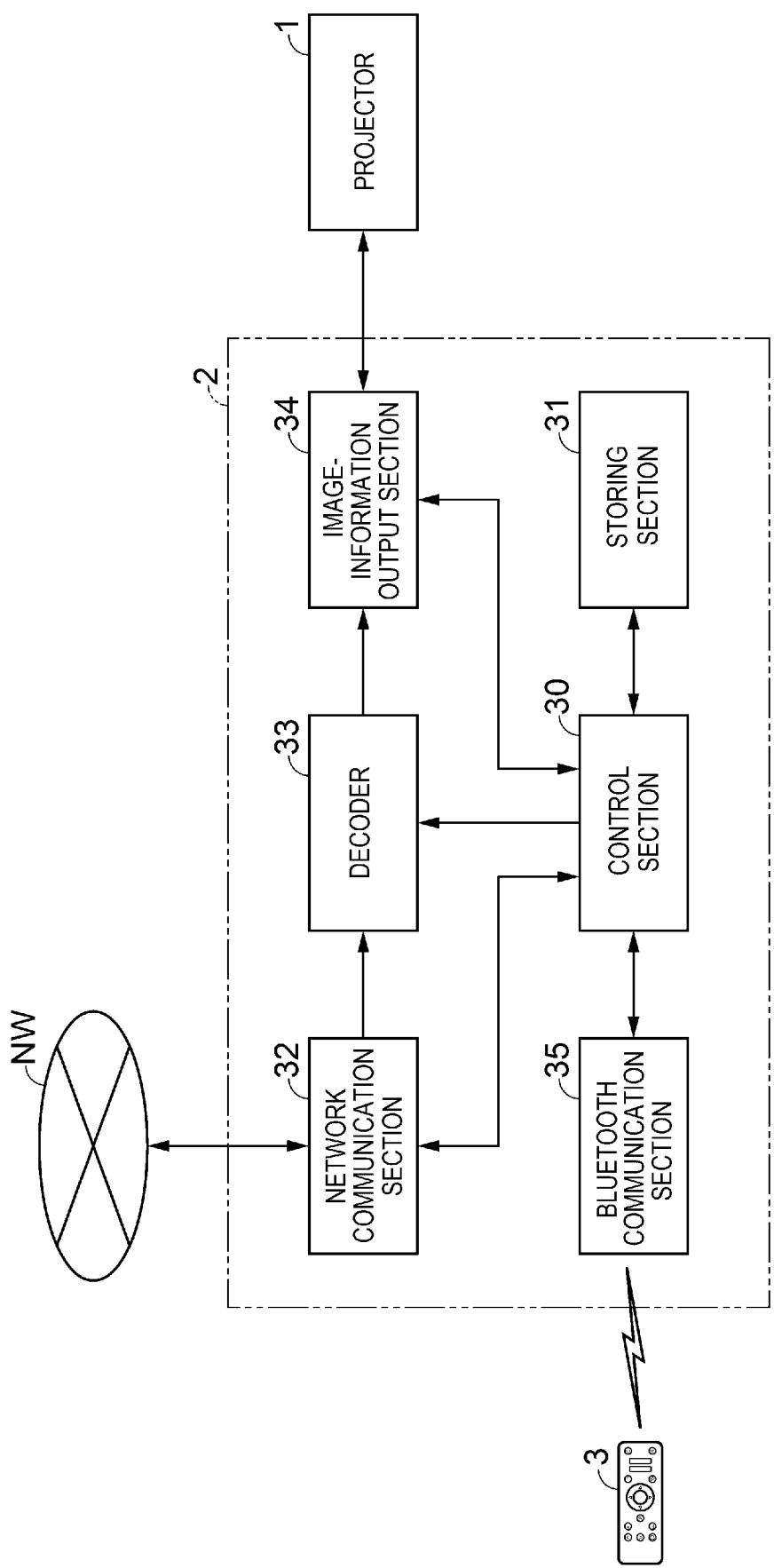
FIG. 3 is a block diagram showing a schematic configuration of an image supply apparatus.
Figure 4:
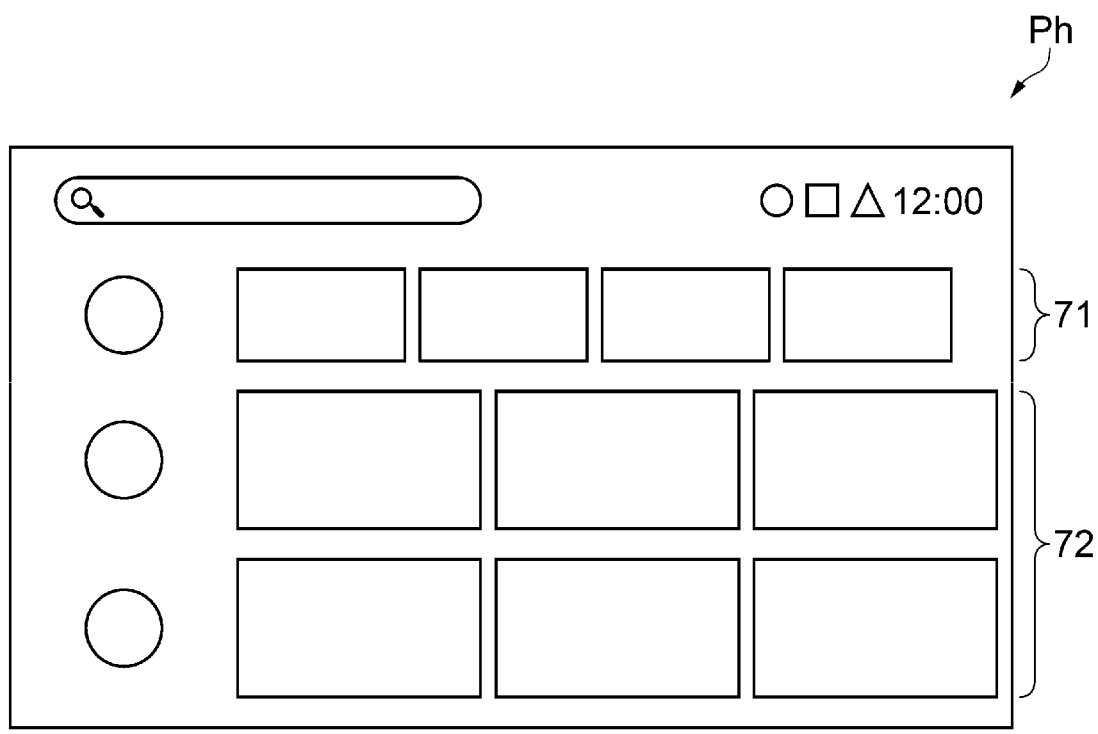
FIG. 4 is a diagram showing a home screen.

FIG. 3 is a block diagram showing a schematic configuration of the image supply apparatus 2. FIG. 4 is a diagram showing a home screen.

As shown in FIG. 3, the image supply apparatus 2 includes a control section 30 functioning as the second control section, a storing section 31, a network communication section 32, a decoder 33, an image-information output section 34 functioning as the second input and output section, and a Bluetooth communication section 35 functioning as the second receiving section.

The control section 30 includes one or a plurality of processors. The control section 30 operates according to a control program stored in the storing section 31 to thereby collectively control the operation of the image supply apparatus 2. The storing section 31 includes a RAM and a ROM. The RAM is used for temporary storage of various data and the like. The ROM stores a control program, control data, and the like for controlling the operation of the image supply apparatus 2.

The network communication section 32 is coupled to the network NW by wire or radio. The network communication section 32 performs transmission and reception of information between the network communication section 32 and external devices coupled to the same network NW. The network communication section 32 in this embodiment receives streaming information distributed from a streaming server of a content distribution service and outputs the received streaming information to the decoder 33.

The decoder 33 decodes the streaming information input from the network communication section 32 and converts the streaming information into image information in a format usable in the projector 1. The decoder 33 in this embodiment decodes the streaming information and generates image information conforming the HDMI.

The image-information output section 34 includes a connection terminal conforming the HDMI in this embodiment. The image-information output section 34 is coupled to a connection terminal of the image-information input section 14 of the projector 1. The image-information output section 34 outputs the image information generated by the decoder 33 to the image-information input section 14 of the projector 1. The image-information output section 34 relays input and output of control information by the CEC of the HDMI. Accordingly, the control section 30 can perform input and output of control information between the control section 30 and the projector 1 via the image-information output section 34.

The Bluetooth communication section 35 includes a communication device conforming to the Bluetooth and performs wireless communication conforming to the Bluetooth using a radio wave in a 2.4 GH band. The Bluetooth communication section 35 receives and decodes a Bluetooth operation signal transmitted from the remote controller 3 and communicates the operation signal to the control section 30.

The image supply apparatus 2 is capable of outputting, based on the control by the control section 30, image information representing a home screen Ph (see FIG. 4) besides image information representing contents to the projector 1. As shown in FIG. 4, the home screen Ph is a screen for selecting contents that should be displayed and is a screen including a plurality of icons 71 for switching a content distribution service and a plurality of thumbnail images 72 for selecting contents. When the image supply apparatus 2 is started or when display of the home screen Ph is instructed by the user, the control section 30 of the image supply apparatus 2 generates image information of the home screen Ph and outputs the image information to the projector 1 from the image-information output section 34. Consequently, the home screen Ph is projected onto the projection surface Sp from the projector 1. When the user performs operation for selecting contents on the home screen Ph using the remote controller 3, the image supply apparatus 2 starts supply of image information of the selected contents. A content image is projected onto the projection surface Sp from the projector 1.

Figure 5:
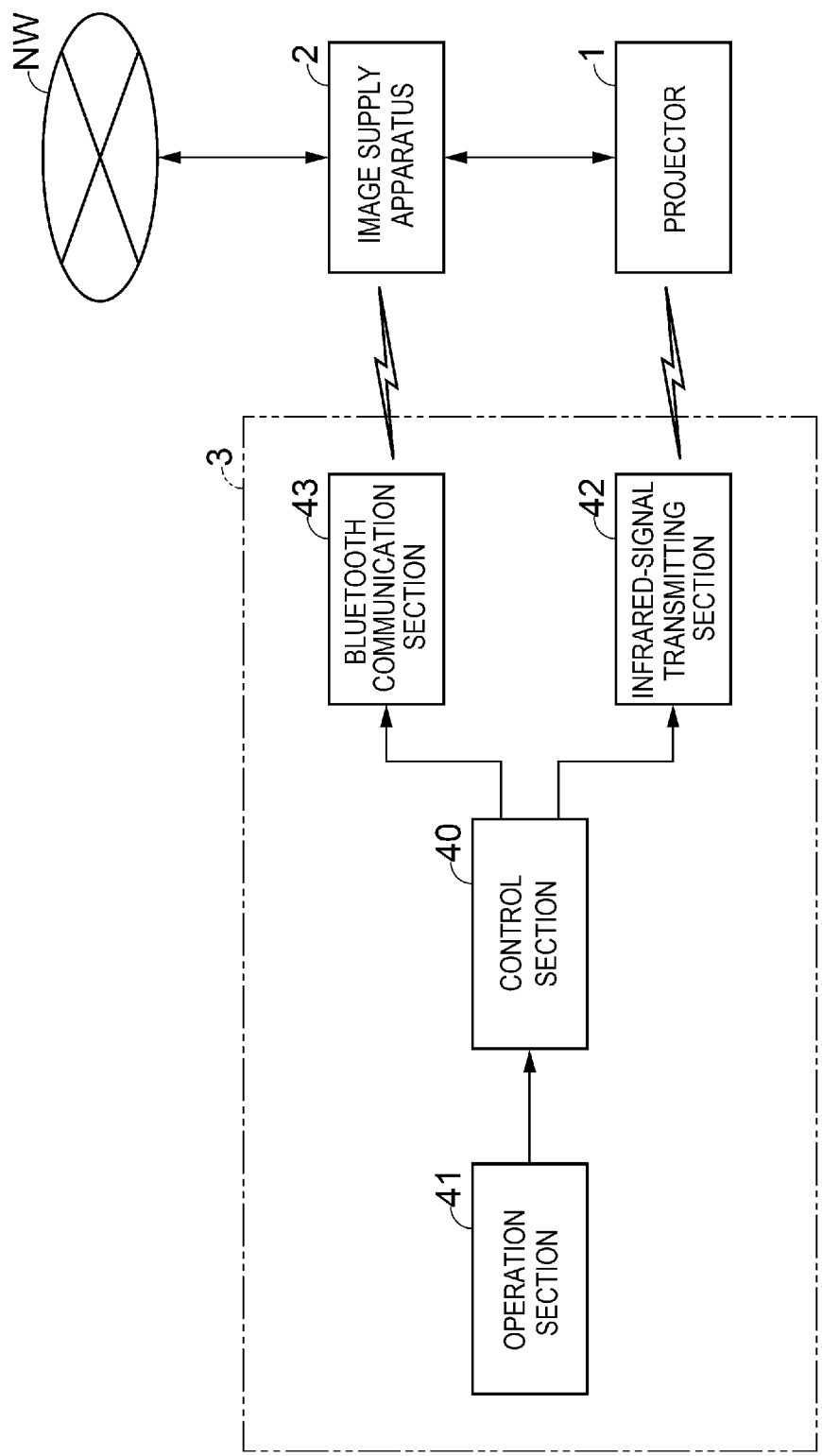
FIG. 5 is a block diagram showing a schematic configuration of a remote controller.
Figure 6:
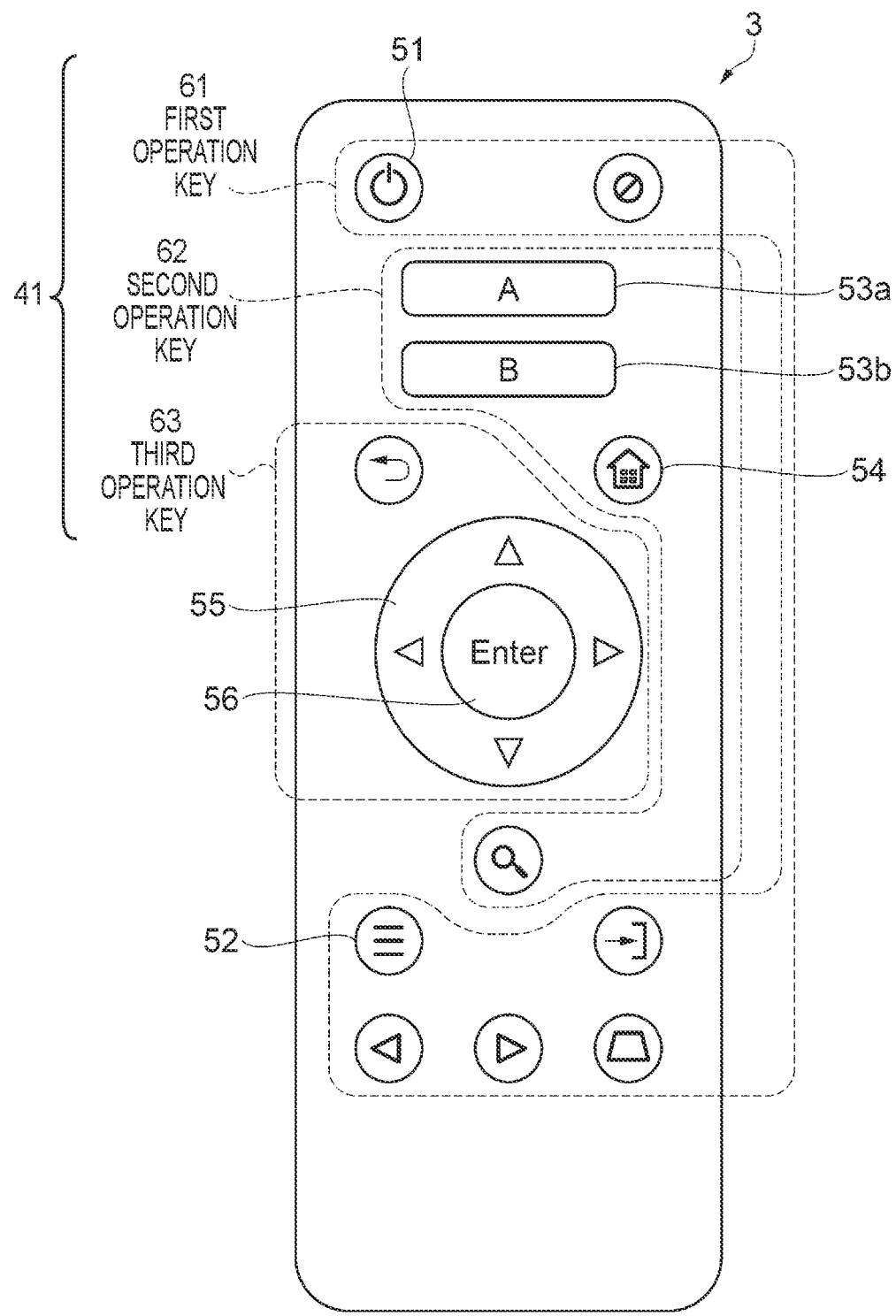
FIG. 6 is a plan view showing the appearance of the remote controller.

FIG. 5 is a block diagram showing a schematic configuration of the remote controller 3. FIG. 6 is a plan view showing the appearance of the remote controller 3.

As shown in FIG. 5, the remote controller 3 includes a control section 40 functioning as the remote-controller control section, an operation section 41, an infrared-signal transmitting section 42 functioning as the first transmitting section, and a Bluetooth communication section 43 functioning as the second transmitting section.

The control section 40 includes one or a plurality of processors and memories such as a RAM and a ROM. The control section 40 operates according to a control program stored in the memories to thereby collectively control the operation of the remote controller 3.

The operation section 41 includes a plurality of operation keys operated by the user. As shown in FIG. 6, the operation keys included in the operation section 41 include a power key 51 for switching ON and OFF of the power supply of the projector 1, a menu key 52 for causing the projector 1 to display the menu image Pm, selection keys 53a and 53b for selecting a content distribution service, a home key 54 for causing the image supply apparatus 2 to display the home screen Ph, a direction key 55 used for, for example, selection of an item on the menu image Pm and selection of contents on the home screen Ph, and a determination key 56 for deciding the selected item, contents, or the like.

The plurality of operation keys are classified into three groups, that is, a first key group 61 used for only the operation of the projector 1, a second key group 62 used for only the operation of the image supply apparatus 2, and a third key group 63 used for the operation of both of the projector 1 and the image supply apparatus 2. The power key 51, the menu key 52, and the like explained above are included in the first key group 61 used for the operation of the projector 1. The selection keys 53a and 53b, the home key 54, and the like are included in the second key group 62 used for the operation of the image supply apparatus 2. The direction key 55, the determination key 56, and the like explained above are included in the third key group 63 used for the operation of both of the projector 1 and the image supply apparatus 2.

Referring back to FIG. 5, the infrared-signal transmitting section 42 includes an encoder for infrared communication and an infrared light emitting device. The infrared-signal transmitting section 42 modulates, based on the control by the control section 40, with the encoder, an operation signal corresponding to input operation to the operation section 41 and transmits, with the infrared light emitting device, the operation signal to the projector 1 as an infrared operation signal. The infrared operation signal is equivalent to the first operation signal.

The Bluetooth communication section 43 includes a communication device conforming to the Bluetooth and performs wireless communication conforming to the Bluetooth between the Bluetooth communication section 43 and the image supply apparatus 2. Specifically, the Bluetooth communication section 43 encodes, based on the control by the control section 40, an operation signal corresponding to input operation to the operation section 41 and transmits the operation signal to the image supply apparatus 2 as a Bluetooth operation signal. The Bluetooth operation signal is equivalent to the second operation signal.

The control section 40 of the remote controller 3 performs different control according to an operation key operated in the operation section 41. Specifically, when an operation key included in the first key group 61 of the operation section 41 is operated, the control section 40 causes the infrared-signal transmitting section 42 to transmit an infrared operation signal to the projector 1. On the other hand, when an operation key included in the second key group 62 is operated, the control section 40 causes the Bluetooth communication section 43 to transmit a Bluetooth operation signal to the image supply apparatus 2. When an operation key included in the third key group 63 is operated, the control section 40 causes the infrared-signal transmitting section 42 to transmit the infrared operation signal and causes the Bluetooth communication section 43 to transmit the Bluetooth operation signal. In other words, when the operation key included in the third key group 63 is operated, the operation signals are transmitted to both of the projector 1 and the image supply apparatus 2.

The operation of the image display system 100 and a control method for the image display system 100 are explained.

Figure 7:
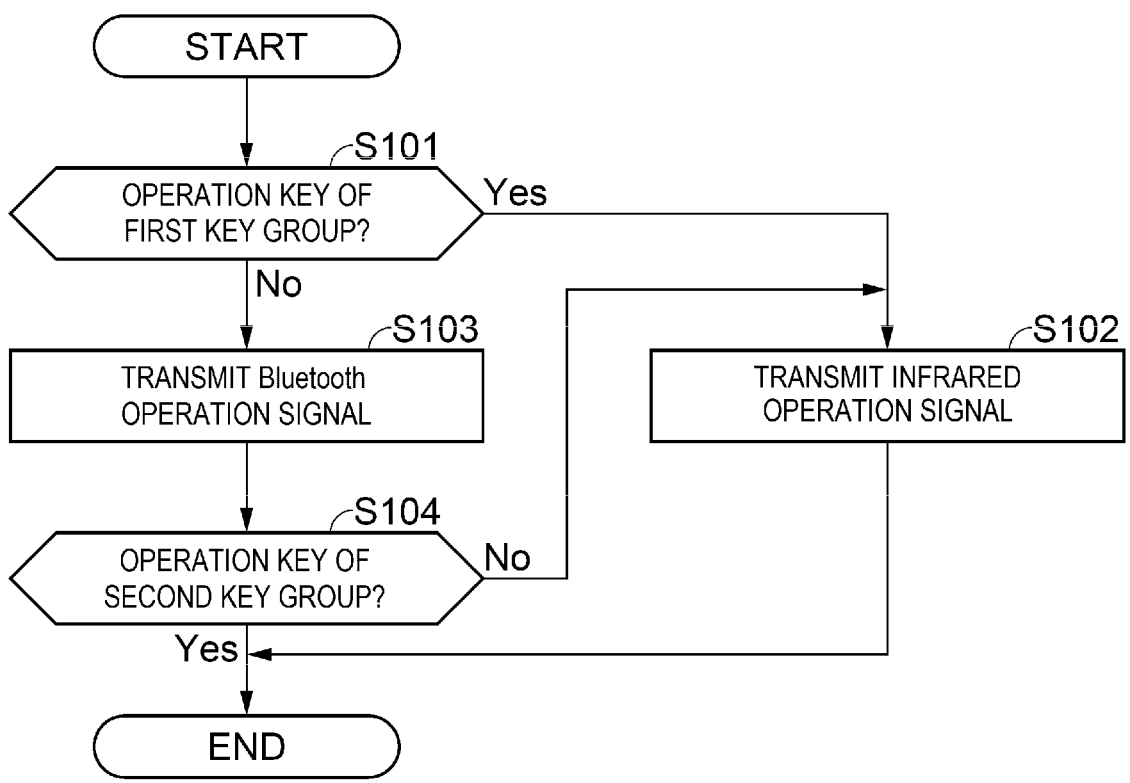
FIG. 7 is a flowchart for explaining the operation of the remote controller.

FIG. 7 is a flowchart for explaining the operation of the remote controller 3. When the user operates any one of the operation keys of the operation section 41 of the remote controller 3, the control section 40 of the remote controller 3 operates according to a flow shown in FIG. 7. It is assumed that wireless connection for performing communication by the Bluetooth is established between the remote controller 3 and the image supply apparatus 2.

As shown in FIG. 7, in step S101, the control section 40 determines whether an operated operation key is an operation key included in the first key group 61. When the operated operation key is an operation key included in the first key group 61, the control section 40 shifts processing to step S102. When the operated operation key is not an operation key included in the first key group 61, the control section 40 shifts the processing to step S103.

When the operation key included in the first key group 61 is operated and the processing shifts to step S102, the control section 40 controls the infrared-signal transmitting section 42 to transmit an infrared operation signal corresponding to the operated operation key and ends the flow.

On the other hand, when an operation key included in the second key group 62 or the third key group 63 is operated and the processing shifts to step S103, the control section 40 controls the Bluetooth communication section 43 to transmit a Bluetooth operation signal corresponding to the operated operation key.

In the following step S104, the control section 40 determines whether the operated operation key is an operation key included in the second key group 62. When the operated operation key is an operation key included in the second key group 62, the control section 40 ends the flow. On the other hand, when the operated operation key is not an operation key included in the second key group 62, that is, the operated operation key is an operation key included in the third key group 63, the control section 40 shifts the processing to step S102, controls the infrared-signal transmitting section 42 to transmit an infrared operation signal corresponding to the operated operation key, and ends the flow.

In this way, when the operated operation key is included in the first key group 61, the control section 40 causes the infrared-signal transmitting section 42 to transmit only the infrared operation signal. When the operated operation key is included in the second key group 62, the control section 40 causes the Bluetooth communication section 43 to transmit only the Bluetooth operation signal. When the operated operation key is included in the third key group 63, the control section 40 causes the infrared-signal transmitting section 42 and the Bluetooth communication section 43 to transmit both of the infrared operation signal and the Bluetooth operation signal.

Since the direction key 55 and the determination key 56 of the remote controller 3 are included in the third key group 63, when these operation keys are operated, the operation signals are transmitted to both of the projector 1 and the image supply apparatus 2. For example, when the direction key 55 of the remote controller 3 is operated, the projector 1 executes selection or the like of an item on the menu image Pm based on the transmitted operation signal if the menu image Pm is being displayed. On the other hand, if the home screen Ph is being displayed, the image supply apparatus 2 performs selection or the like of contents based on the operation signal transmitted according to the operation of the direction key 55. In the image display system 100 in this embodiment, in order to suppress contents from being unintentionally switched when the selection or the like of an item is performed in the menu image Pm, a part of the operation signal transmitted to the image supply apparatus 2 is controlled to be disabled when the menu image Pm is displayed.

Figure 8:
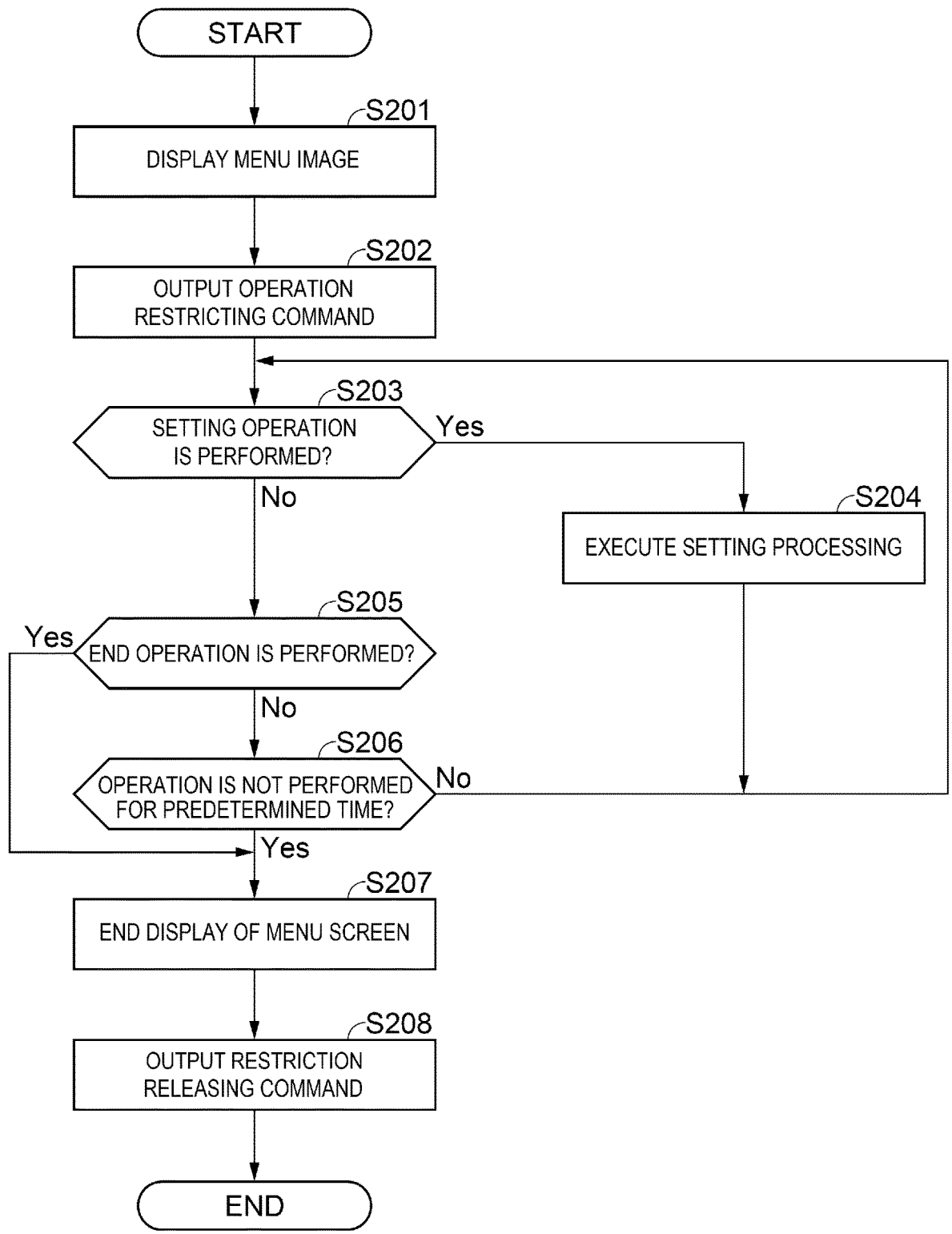
FIG. 8 is a flowchart showing the operation of the projector at the time when the projector displays a menu image.
Figure 9:
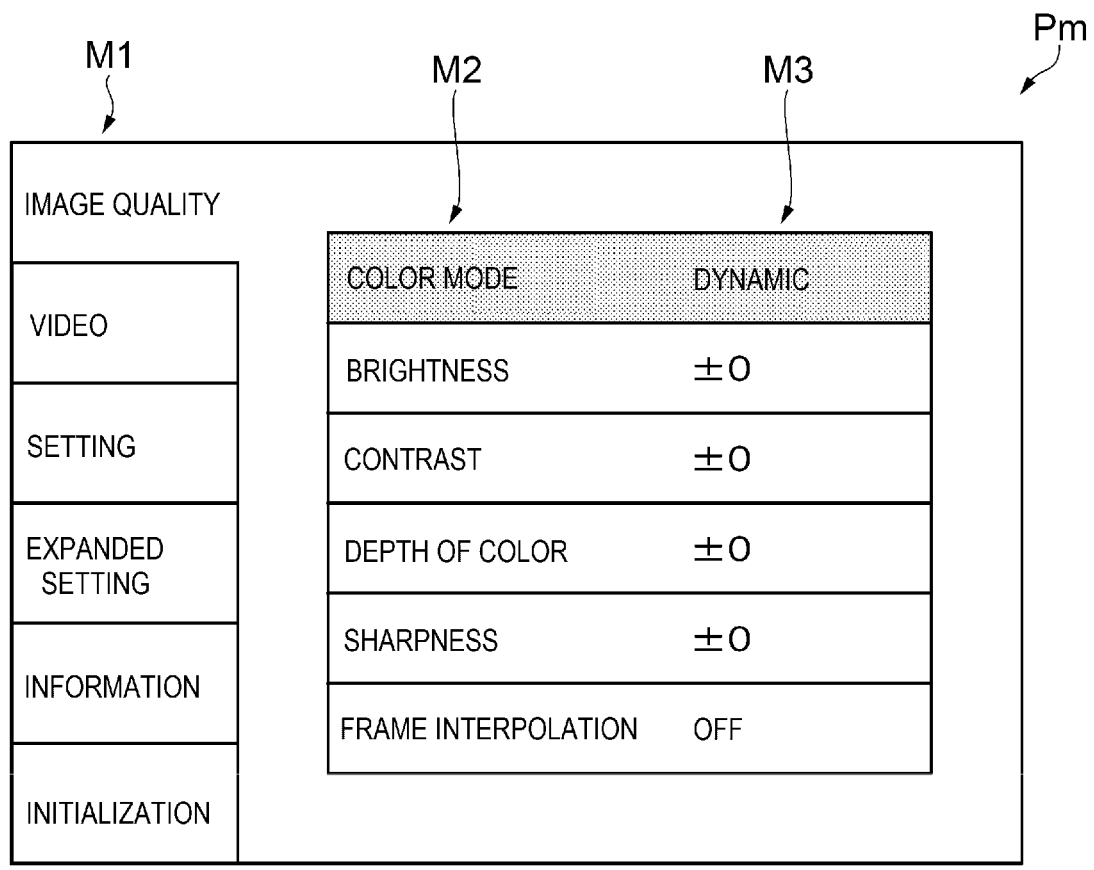
FIG. 9 is a diagram showing the menu image.

FIG. 8 is a flowchart showing the operation of the projector 1 at the time when the menu image Pm is displayed. FIG. 9 is a diagram showing the menu image Pm.

When the user operates the menu key 52 of the remote controller 3, an operation signal indicating a start of the display of the menu image Pm is transmitted from the remote controller 3. When the infrared-signal receiving section 13 of the projector 1 receives the operation signal, the control section 10 of the projector 1 operates according to a flow shown in FIG. 8.

As shown in FIG. 8, in step S201, the control section 10 performs control for instructing the image-information processing section 15 to display the menu image Pm on a supply image being displayed, that is, a content image or the home screen Ph. Specifically, image information corresponding to the menu image Pm is stored in the storing section 11. The control section 10 reads out the image information from the storing section 11 and outputs the image information to the image-information processing section 15. As a result, the menu image Pm is superimposed on the content image and the home screen Ph as an OSD image and displayed on the projection surface Sp.

The menu image Pm is an image for performing setting and adjustment related to the operation of the projector 1. As shown in FIG. 9, a plurality of items M1 are arrayed on the left side of the menu image Pm as choices. The menu image Pm has a hierarchical structure. When the user operates the remote controller 3 and selects one item M1, a plurality of lower-order items M2 concerning the selected item M1 are displayed on the right side of the menu image Pm as new choices. On the right side of the items M2, parameters M3 currently set for the items M2 are displayed. When the user selects one item M2 out of the plurality of items M2, a not-shown setting screen concerning the selected item M2 is displayed. The parameters M3 can be changed on the setting screen. The user can select the items M1 and M2 and change the parameters M3 by operating the direction key 55 of the remote controller 3 and can decide the selected items M1 and M2 and the changed parameters M3 by operating the determination key 56. The user can end the display of the menu image Pm by operating the menu key 52 of the remote controller 3 again in a state in which the menu image Pm is displayed.

Referring back to FIG. 8, in step S202, the control section 10 outputs an operation restricting command to the image supply apparatus 2 via the image-information input section 14 according to the CEC of the HDMI. When the operation restricting command is input, the image supply apparatus 2 disables, until a restriction releasing command explained below is input, an operation signal corresponding to the third key group 63 of the remote controller 3, that is, a control signal transmitted when an operation key included in the third key group 63 is operated.

In step S203, the control section 10 determines whether setting operation for the menu image Pm is performed by the remote controller 3, that is, the direction key 55 or the determination key 56 of the remote controller 3 is operated. When the setting operation is performed, the control section 10 shifts the processing to step S204. When the setting operation is not performed, the control section 10 shifts the processing to step S205.

When the setting operation is performed and the processing shifts to step S204, the control section 10 executes setting processing corresponding to the setting operation and returns the processing to step S203. Specifically, the control section 10 selects the items M1 and M2 and the parameters M3 according to the operation of the direction key 55, decides the items M1 and M2 and the parameters M3 according to the operation of the determination key 56, and updates the item M2 displayed according to the selected item M1.

When the setting operation is not performed in step S203 and the processing shifts to step S205, the control section 10 determines whether end operation for ending the display of the menu image Pm, that is, operation of the menu key 52 of the remote controller 3 is performed by the user. When the end operation is performed, that is, when the operation signal received by the infrared-signal receiving section 13 indicates an end of the display of the menu image Pm, the control section 10 shifts the processing to step S207. When the end operation is not performed, the control section 10 shifts the processing to step S206.

When the processing shifts to step S206, the control section 10 determines whether operation of the remote controller 3 is not performed for a predetermined time, that is, whether a time in which the infrared-signal receiving section 13 does not receive an operation signal from the remote controller 3 has reached the predetermined time. When the time has reached the predetermined time, the control section 30 shifts the processing to step S207. When the time has not reached the predetermined time, the control section 30 returns the processing to step S203.

When the end operation is performed or operation of the remote controller 3 is not performed for the predetermined time and the processing shifts to step S207, the control section 10 controls the image-information processing section 15 to end the display of the menu image Pm and restores the projector 1 to a state in which the entire content image or home screen Ph is displayed.

In step S208, the control section 10 outputs the restriction releasing command to the image supply apparatus 2 via the image-information input section 14 according to the CEC of the HDMI and ends the flow. When the restriction releasing command is input, the image supply apparatus 2 thereafter resumes the control corresponding to the control signal corresponding to the third key group 63 of the remote controller 3.

Figure 10:
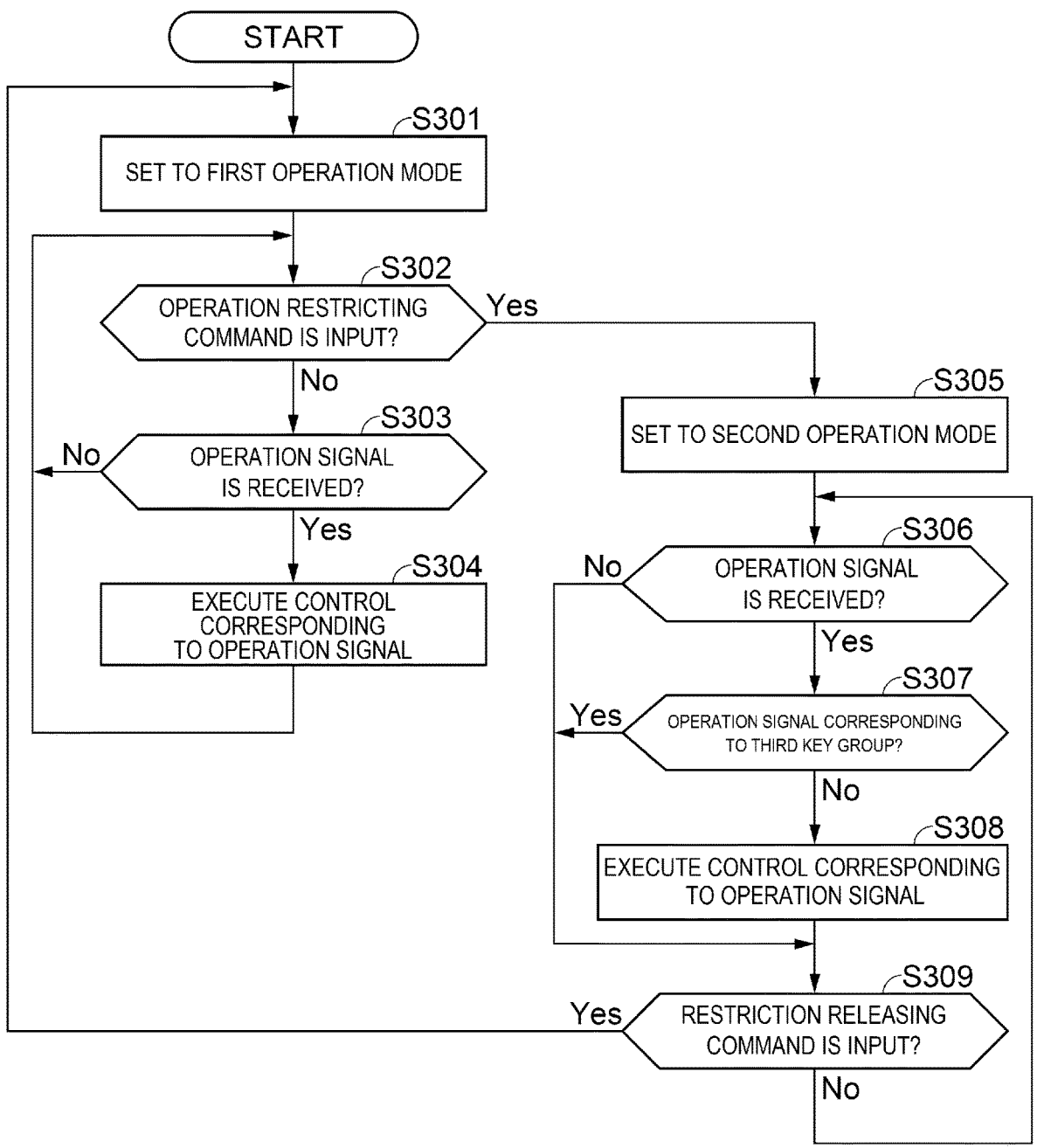
FIG. 10 is a flowchart for explaining the operation of the image supply apparatus.

FIG. 10 is a flowchart for explaining the operation of the image supply apparatus 2. When supply of electric power is started, the control section 30 of the image supply apparatus 2 operates according to a flow shown in FIG. 10.

As shown in FIG. 10, in step S301, the control section 30 sets an operation state of the image supply apparatus 2 to a first operation mode. The first operation mode is an operation state in which all the operation keys included in the remote controller 3 are enabled.

In step S302, the control section 30 determines whether an operation restricting command is input from the projector 1 via the image-information output section 34 according to the CEC of the HMDI. When the operation restricting command is not input, the control section 30 shifts processing to step S303. When the operation restricting command is input, the control section 30 shifts the processing to step S305.

When the operation restricting command is not input and the processing shifts to step S303, the control section 30 determines whether the Bluetooth communication section 35 receives an operation signal from the remote controller 3. When the operation signal is received, the control section 30 shifts the processing to step S304. When the operation signal is not received, the control section 30 returns the processing to step S302.

When the operation signal is received and the processing shifts to step S304, the control section 30 executes control corresponding to the received operation signal and thereafter returns the processing to step S302. For example, when the Bluetooth communication section 35 receives an operation signal indicating that the home key 54 of the remote controller 3 is operated, the control section 30 performs control for outputting image information of the home screen Ph to the projector 1. In a state in which the home screen Ph is displayed, when the Bluetooth communication section 35 receives an operation signal indicating that the direction key 55 and the determination key 56 of the remote controller 3 are operated, the control section 30 executes control for switching contents. When the Bluetooth communication section 35 receives an operation signal indicating that the selection keys 53a and 53b for switching the content distribution service are operated, the control section 30 executes control for connection to a new content distribution service.

When the operation restricting command is input in step S302 and the processing shifts to step S305, the control section 30 sets the operation state of the image supply apparatus 2 to a second operation mode. The second operation mode is an operation state in which the operation keys included in the third key group 63 among the operation keys included in the remote controller 3 are disabled.

In step S306, the control section 30 determines whether the Bluetooth communication section 35 receives an operation signal from the remote controller 3. When the operation signal is received, the control section 30 shifts the processing to step S307. When the operation signal is not received, the control section 30 shifts the processing to step S309.

When the operation signal is input and the processing shifts to step S307, the control section 30 determines whether the input operation signal is an operation signal corresponding to the third key group 63, that is, an operation signal transmitted when an operation key included in the third key group 63 is operated. When the received operation signal is not the operation signal corresponding to the third key group 63, the control section 30 shifts the processing to step S308. As in step S304, the control section 30 preforms control corresponding to the received operation signal and thereafter shifts the processing to step S309. On the other hand, when the received operation signal is the operation signal corresponding to the third key group 63, the control section 30 shifts the processing to step S309 without performing the control corresponding to the received operation signal. In other words, in the second operation mode, the control section 30 disables the operation signal corresponding to the third key group 63. In other words, the control section 30 stops the control corresponding to the operation signal corresponding to the third key group 63.

In step S309, the control section 30 determines whether a restriction releasing command is input from the projector 1 via the image-information output section 34 according to the CEC of the HDMI. When the restriction releasing command is input, the control section 30 returns the processing to step S301 and switches the operation state of the image supply apparatus 2 to the first operation mode in which all the operation keys are enabled. On the other hand, when the restriction releasing command is not input, the control section 30 returns the processing to step S306 and continues the second operation mode.

As explained above, with the image display system 100 and the control method for the image display system 100 in this embodiment, the following effects can be obtained.

(1) According to this embodiment, the image supply apparatus 2 stops the control based on the operation signal corresponding to the third key group 63 in the period from when the operation restricting command is input until when the restriction releasing command is input. Accordingly, even if operation of an operation key of the third key group 63 is performed as setting operation in this period, the operation is disabled and the image supply apparatus 2 is suppressed from performing unintended operation.

(2) According to this embodiment, the operation of the operation keys of the third key group 63 are disabled in the image supply apparatus 2 while the projector 1 is displaying the menu image Pm. Therefore, the image supply apparatus 2 is suppressed from performing unintended operation according to operation for the menu image Pm.

(3) According to this embodiment, when the end of the display of the menu image Pm is instructed by the remote controller 3, the control section 10 of the projector 1 outputs the restriction releasing command to the image supply apparatus 2. Therefore, it is possible to disable the operation of the operation keys of the third key group 63 in a period corresponding to an instruction of the user.

(4) According to this embodiment, when the operation of the remote controller 3 is not performed for the predetermined time, the control section 10 of the projector 1 outputs the restriction releasing command. Therefore, a period in which the operation of the operation key of the third key group 63 is disabled is suppressed from being uselessly extended.

(5) According to this embodiment, when the projector is operated using the remote controller 3 capable of transmitting both of the infrared operation signal and the Bluetooth operation signal, the image supply apparatus 2 is suppressed from performing unintended operation.

In the embodiment, the operation keys included in the first key group 61 are equivalent to the first operation key, the operation keys included in the second key group 62 are equivalent to the second operation key, and the operation keys included in the third key group 63 are equivalent to the third operation key. The operation restricting command is equivalent to the first command and the restriction releasing command is equivalent to the second command. The display of the menu image Pm is equivalent to the first operation. The operation of the menu key 52 for displaying the menu image Pm being performed is equivalent to the condition for starting the first operation. The end operation for ending the display of the menu image Pm being performed and the time in which the infrared operation signal is not input from the remote controller 3 reaching the predetermined time are equivalent to the condition for ending the first operation. When one of the conditions is satisfied, the second command is output.

The embodiment may be changed as explained below.

In the embodiment, the projector 1 outputs the operation restricting command to the image supply apparatus 2 when the menu key 52 of the remote controller 3 is operated. However, it is also desirable to output the operation restricting command when a menu key of the operation section 12 is operated. With this configuration, it is also possible to suppress unintended operation of the image supply apparatus 2 when the operation of the remote controller 3 and the operation of the operation section 12 are mixed.

In the embodiment, the projector 1 outputs the operation restricting command only once when the menu key 52 of the remote controller 3 is operated. When the image supply apparatus 2 is likely to fail in acquisition of the operation restricting command, the projector 1 desirably outputs the operation restricting command a plurality of times. For example, the projector 1 may output the operation restricting command every time the setting operation for the menu image Pm, that is, the operation of the direction key 55 and the determination key 56 is performed.

In the embodiment, the projector 1 outputs the operation restricting command to the image supply apparatus 2 when the menu key 52 of the remote controller 3 is operated. However, the projector 1 may output the operation restricting command when another operation key is operated. For example, when the projector 1 has a function of correcting an image distorted in a trapezoidal shape because of projection from an oblique direction into a rectangular shape and a trapezoidal distortion correction key is included in the remote controller 3 as an operation key for executing this function, the projector 1 may output the operation restricting command when the trapezoidal distortion correction key is operated. With such a form, when a correcting direction and a correction amount are adjusted by the direction key 55 and the determination key 56 after the trapezoidal distortion correction key is operated, the image supply apparatus 2 is suppressed from performing unintended operation. In this form, the correction of the trapezoidal distortion is equivalent to the first operation.

In a form in which a volume adjustment key for adjusting the volume of sound emitted from a not-shown speaker is included in the remote controller 3 and the volume can be increased and reduced by operation of the direction key 55, the determination key 56, and the like after the volume adjustment key is operated, the projector 1 may output the operation restricting command when the volume adjustment key is operated. In a form in which the image-information input section 14 includes a plurality of connection terminals and an input selection key for selecting an enabled connection terminal out of the plurality of connection terminals is included in the remote controller 3, the projector 1 may display an input selection image including a list of the connection terminals as an OSD image when the input selection key is operated and output the operation restricting command prior to receiving operation of the direction key 55, the determination key 56, and the like for selecting a connection terminal.

In the embodiment, both of the operation key for starting the display of the menu image Pm and the operation key for ending the display of the menu image Pm are the menu key 52. However, these operation keys do not need to be the same operation key and may be different operation keys.

In the embodiment, the projector 1 outputs the operation restricting command to the image supply apparatus 2 when the menu key 52 of the remote controller 3 is operated. However, the projector 1 may output the operation restricting command without involving operation of an operation key when specific processing occurs and output the restriction releasing command when the processing ends. For example, when detecting that an abnormality occurs in the projector 1, the control section 10 controls the image-information processing section 15 to start processing for superimposing, as an OSD image, a message image including a message for informing that the abnormality occurs on a supply image being displayed. Specifically, image information of the message image is stored in the storing section 11 in advance. The control section 10 reads out the image information, outputs the image information to the image-information processing section 15, superimposes the image information of the message image on image information input from the image-information input section 14. When the abnormality that occurs in the projector 1 is not detected any more, the control section 10 controls the image-information processing section 15 to end the superimposition of the message image. In this case, when the image-information processing section 15 starts the processing for superimposing the message image, the control section 10 may output the operation restricting command to the image supply apparatus 2. When the image-information processing section 15 ends the processing for superimposing the message image, the control section 10 may output the restriction releasing command to the image supply apparatus 2. In this form, the message image is equivalent to the image including the message indicating the state of the projector 1. The display of the message image is equivalent to the first operation. Detecting the occurrence of the abnormality in the projector 1 is equivalent to the condition for starting the first operation. Not detecting the abnormality that occurs in the projector 1 any more is equivalent the condition for ending the first operation.

In the embodiment, the projector 1 is operated by the infrared operation signal and the image supply apparatus 2 is operated by the Bluetooth operation signal. However, the combinations of the devices and the communication schemes may be changed. Operation signals in communication schemes other than the infrared and the Bluetooth may be adopted.

In this embodiment, the transmission-type liquid crystal light valves 22R, 22G, and 22B are used as the light modulating devices. However, reflection-type light modulating devices such as reflection-type liquid crystal light valves can also be used. A digital mirror device or the like that modulates light emitted from the light source 21 by controlling an emitting direction of incident light for each of micromirrors functioning as pixels can also be used. The present disclosure is not limited to the configuration including the plurality of light modulating devices for each of the color lights and may be a configuration for modulating a plurality of color lights in a time-division manner with one light modulating device.

In the embodiment, the projector 1 is explained as an example of the image display apparatus. However, the image display apparatus is not limited to the projector 1 and may be other image display apparatuses such as a liquid crystal display and an organic EL (Electro Luminescence) display.

In the embodiment, the set-top box is illustrated as the image supply apparatus 2. However, the image supply apparatus 2 is not limited to the set-top box and may be various image reproduction devices and the like.

Modification During Image Source Selection

In the embodiment, the example of the first operation at the time when the projector 1 projects and displays the menu image Pm is explained. However, the present disclosure is not limited to this. Specifically, the projector 1 only has to start the first operation when specific operation not involved in the image supply apparatus 2 and relating to the projector 1 is performed or in a specific state.

Figure 11:
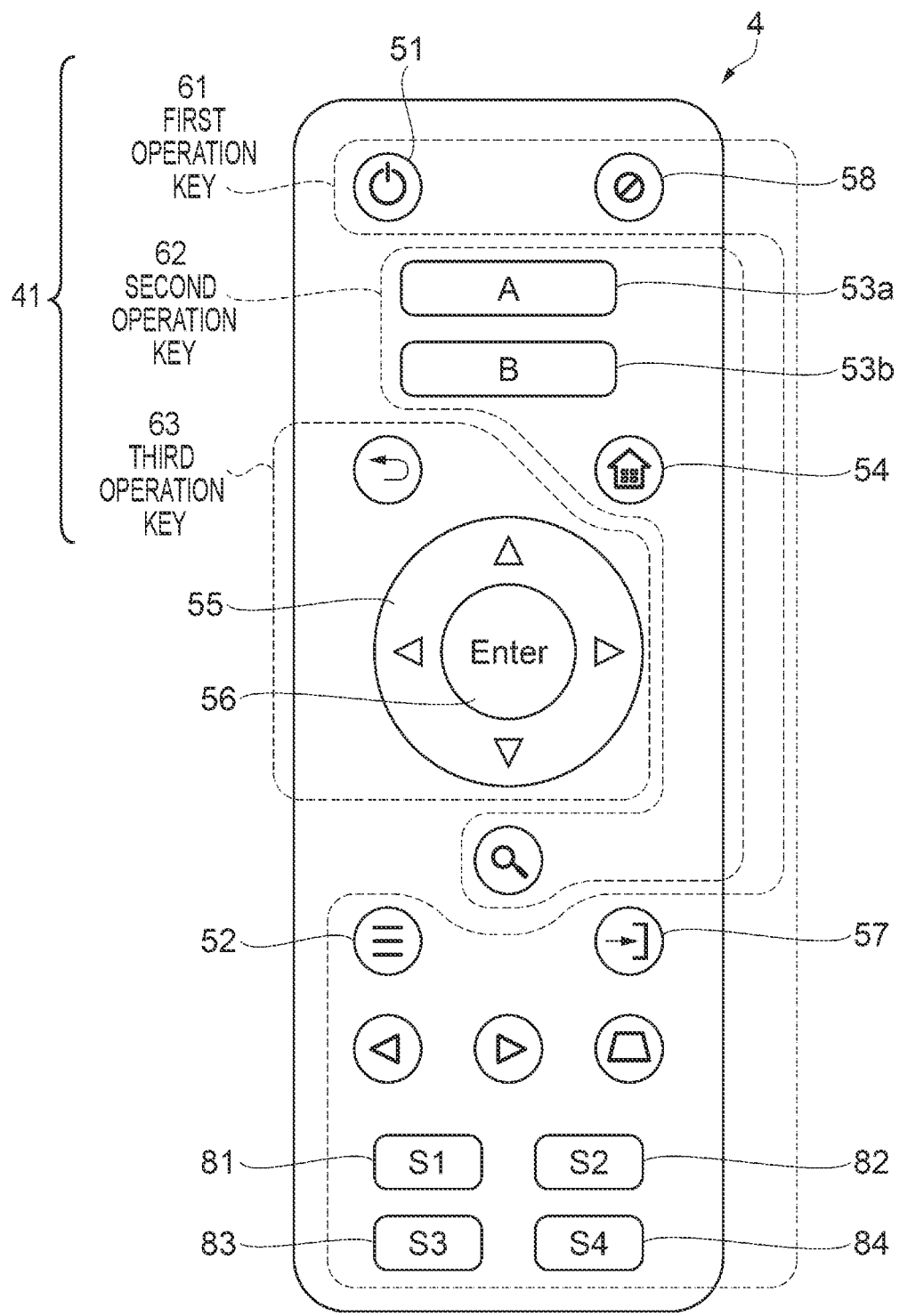
FIG. 11 is a plan view showing the appearance of the remote controller.

FIG. 11 is a plan view showing the appearance of a remote controller 4 in this modification. FIG. 11 corresponds to FIG. 6.

The remote controller 4 shown in FIG. 11 has the same basic configuration as the basis configuration of the remote controller 3 shown in FIG. 6. However, the remote controller can easily perform switching of an image source. Specifically, the remote controller 4 includes a source selection key 57 and four direct selection keys 81 to 84. The remote controller 4 also includes an AV (Audio Visual) mute key 58. As explained above, a plurality of connection terminals including an HDMI terminal are provided in the image-information input section 14 of the projector 1. Specifically, the image-information input section 14 includes three HDMI terminals and one VGA (Video Graphics Array) terminal. When the source selection key 57 is operated, a source selection image capable of listing the four connection terminals is OSD-displayed. Further, the remote controller 4 may include a USB (Universal Serial Bus) terminal and a LAN (Local Area Network) terminal.

In this modification, the image supply apparatus 2 is coupled to first HDMI terminal. When the direct selection key 81 is operated, the source selection image is not displayed and the first HDMI terminal is directly selected. The first HDMI terminal is referred to as source S1 as well.

A BD (Blu-ray (registered trademark) Disc) player is coupled to a second HDMI terminal. When the direction selection key 82 is operated, the second HDMI terminal is directly selected. The second HDMI terminal is referred to as source S2 as well.

A digital video camera is coupled to a third HDMI terminal. When the direct selection key 83 is operated, the third HDMI terminal is directly selected. The third HDMI terminal is referred to as source S3.

A notebook PC (Personal Computer) is coupled to a VGA terminal. When the direct selection key 84 is operated, the VGA terminal is directly selected. The VGA terminal is referred to as source S4 as well.

The source selection key 57 and the direct selection keys 81 to 84 are included in the first key group 61 used for only the operation of the projector 1. The AV mute key 58 is also included in the first key group 61. The remote controller 4 is the same as the remote controller 3 except that the remote controller 4 includes the plurality of keys for image source selection. The remote controller 4 has the same configuration and the same function as the configuration and the function explained with reference to FIGS. 5 to 7. In the following explanation, the same parts as the parts of the remote controller 3 are denoted by the same reference numerals and signs and redundant explanation of the parts is omitted.

Operation Form in the Source Selection Image

Figure 12:
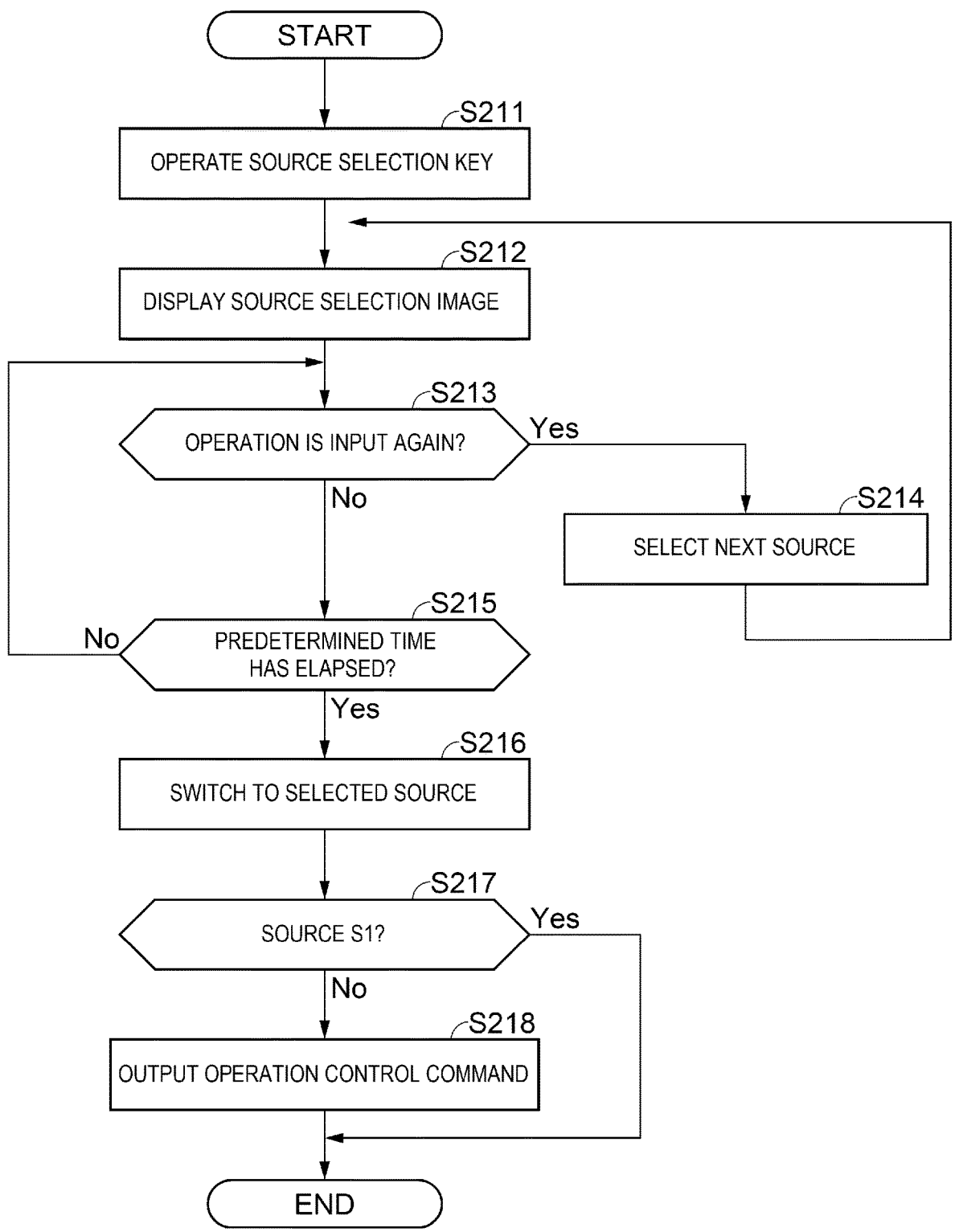
FIG. 12 is a flowchart showing the operation of the projector at the time when the projector displays a source selection image.
Figure 13:
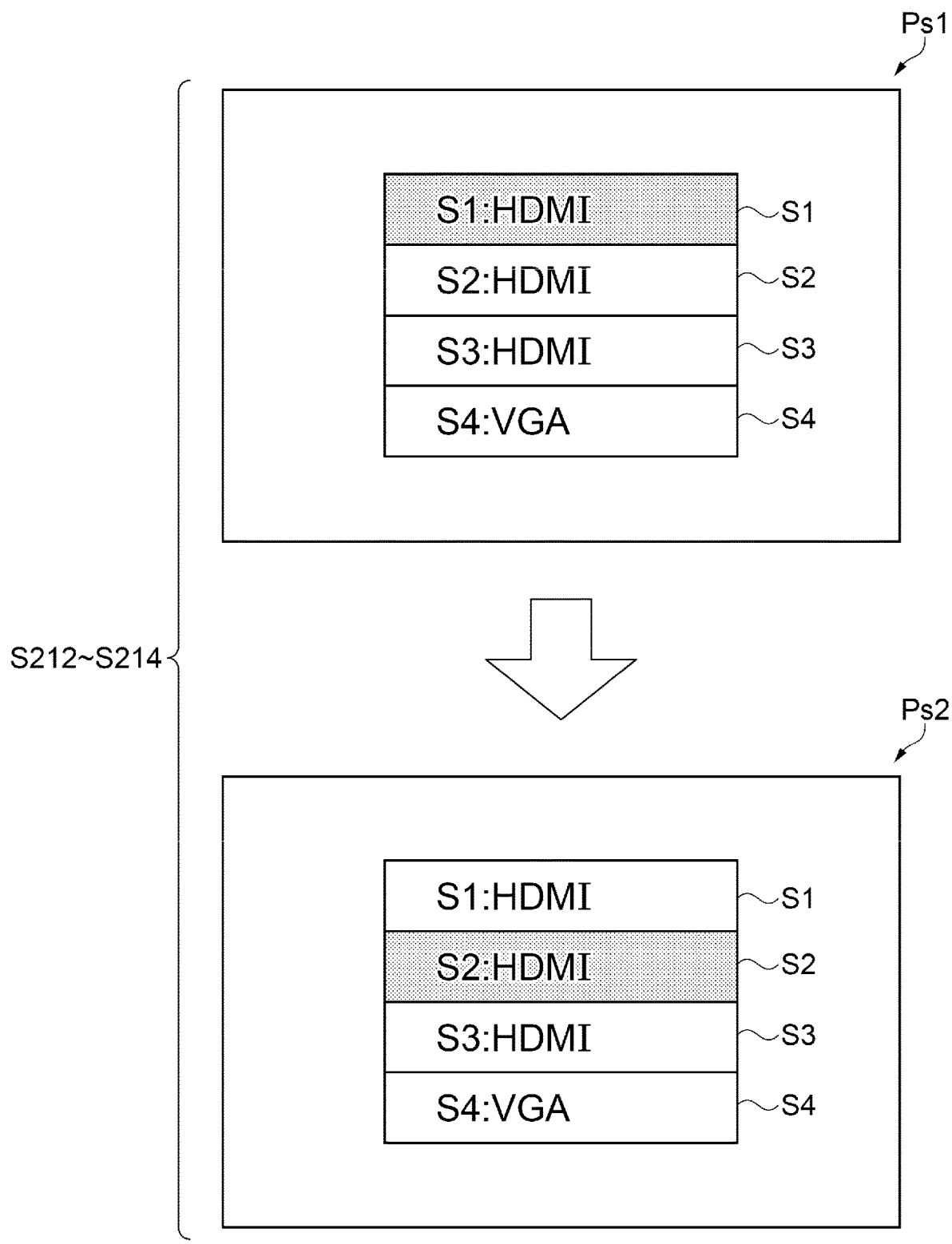
FIG. 13 is a diagram showing the source selection image.

FIG. 12 is a flowchart showing the operation of the projector 1 at the time when the projector 1 displays the source selection image. FIG. 13 is a diagram showing the source selection image and corresponds to FIG. 9. The same parts as the parts explained above are denoted by the same reference numerals and signs and redundant explanation of the parts is omitted. The operation explained below is realized by the projector 1 controlling the sections of the projector 1 according to the control program stored in the storing section 11 while being triggered by an operation signal received from the remote controller 4.

In step S211, an operation input of the source selection key 57 from the remote controller 4 is received. Specifically, the infrared-signal receiving section 13 receives an operation signal for the source selection key 57 from the remote controller 4 and communicates the operation signal to the control section 10 of the projector 1.

In step S212, the control section 10 causes the image-information processing section 15 to display a source selection image Ps1. Specifically, the control section 10 reads out image information of the source selection image Ps1 from the storing section 11 and outputs the image information to the image-information processing section 15. Consequently, the source selection image Ps1 shown in FIG. 13 is superimposed and displayed on a content image or the home screen Ph as an OSD image.

The source selection image Ps1 is a selection list screen for selecting a desired image supply source out of a plurality of image supply sources including the image supply apparatus 2 coupled to the projector 1. In other words, the source selection image Ps1 is a list screen of a plurality of connection terminals of the projector 1 and is a selection screen for selecting a connection terminal to which a desired image supply source is coupled. The image supply source is referred to as image source or source as well.

As explained above, the projector 1 includes the three HDMI terminals and the one VGA terminal. In the source selection image Ps1, the source S1, the source S2, the source S3, and the source S4 are displayed as a list in order from the top. In the source selection image Ps1, the source S1, which is the HDMI terminal to which the image supply apparatus 2 is coupled, is reversely displayed and is in a selected state. The BD player is coupled to the HDMI terminal of the source S2. The digital video camera is coupled to the HDMI terminal of the source S3. The notebook PC is coupled to the VGA terminal of the source S4.

In step S213, the control section 10 determines whether the operation input of the source selection key 57 from the remote controller 4 is performed again. When the operation input is performed again, the control section 10 proceeds to step S214. When the operation input is not performed again, the control section 10 proceeds to step S215.

In step S214, since the operation input of the source selection key 57 is performed, the control section 10 selects the next image supply source and returns to step S212. Consequently, as shown in a source selection image Ps2 shown in FIG. 13, the next source S2 of the source S1 is selected and reversely displayed. When the source selection key 57 is operated again in a state in which the source S2 is selected, the next source S3 is selected. In this way, every time the operation of the source selection key 57 is performed within a predetermined time, the sources are sequentially switched to the selected state. Consequently, it is possible to cyclically perform the source selection.

In step S215, the control section 10 determines whether the predetermined time has elapsed in a state in which the operation input of the source selection key 57 is not performed. When the predetermined time has elapsed, the control section 10 proceeds to step S216. When the predetermined time has not elapsed, the control section 10 returns to step S213. The predetermined time is several seconds. In a preferred example, the predetermined time is set to four seconds.

In step S216, after switching the image source to the selected source, the control section 10 ends the display of the source selection image. In other words, the control section 10 decides the selected source and ends the display of the source selection image. For example, in the case of the source selection image Ps2, the control section 10 switches the image source from the selected image source to the source S2 on the rear surface of the OSD display and ends the source selection image Ps2.

In step S217, the control section 10 determines whether the selected source is the source S1. When the selected source is the source S1, the control section 10 ends the processing. When the selected source is not the source S1, the control section 10 proceeds to step S218.

In step S218, the control section 10 outputs the operation restricting command to the image supply apparatus 2 via the image-information input section 14 according to the CEC of the HDMI. As explained in the embodiment, the image supply apparatus 2, which receives the operation restricting command, disables operation corresponding to the third key group 63 of the remote controller 4 until the image supply apparatus 2 receives the restriction releasing command.

As explained above, with the source selection program, when the selected source is the source S1, the operation restricting command is not output. When the selected source is the sources S2 to S4, the operation restricting command is output. In other words, when the selected source is the sources S2 to S4, since the condition for starting the first operation is satisfied, the operation restricting command is output. Consequently, it is possible to suppress the image supply apparatus 2 from performing unintended operation.

In this way, for example, when the source S1 is selected and the operation of the source selection key 57 for changing the projector 1 from a first state in which the image information supplied from the image supply apparatus 2 is used to a second state in which the image information supplied from the image supply apparatus 2 is not used is performed, the control section 10 of the projector 1 outputs the operation restricting command to the image supply apparatus 2 as the first command. When the operation for selecting the image supply apparatus 2 is performed again, the control section 10 outputs the restriction releasing command to the image supply apparatus 2 as the second command. Selecting the image supply apparatus 2 of the source S1 by operating the source selection key 57 from a state in which an image source other than the source S1 is selected is equivalent to performing the operation for changing the projector 1 functioning as the image display apparatus from the second state to the first state.

A flow of the flowchart of FIG. 12 is a flow in which, after the source is decided in step S216, the operation restricting command is output. The flow is not limited to this. For example, after the source selection image Ps1 is displayed in step S212, the operation restricting command may be output in the next step. In this case, when the source S1 is selected in step S217, the control section 10 outputs the restriction releasing command. With this method, it is possible to obtain the same action effects as the action effects explained above.

Operation Form in the Direct Source Selection

Figure 14:
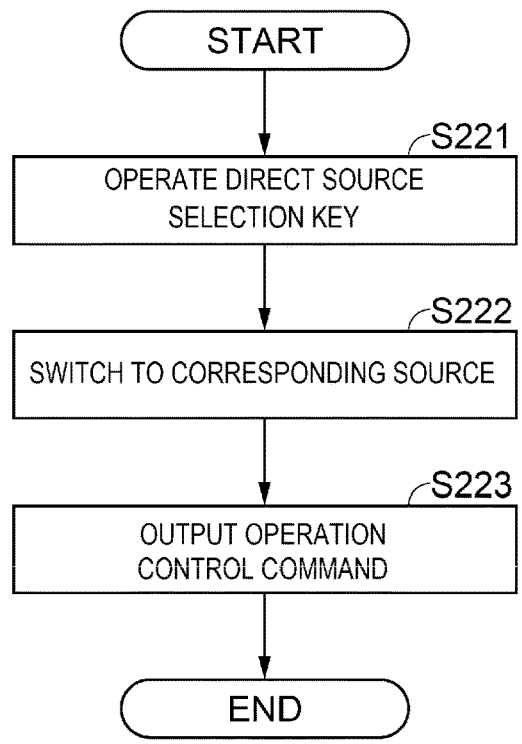
FIG. 14 is a flowchart showing the operation of the projector at the time when the projector performs direct source selection.

FIG. 14 is a flowchart showing a flow of processing at the time when the direct selection key is operated. As explained above, when the direct selection keys 81 to 84 of the remote controller 4 are operated, the source selection image is not displayed and a desired image source is directly selected. In the following explanation, an operation flow of the projector 1 at the time when the direct selection key is pressed is explained mainly with reference to FIG. 14 and with reference to FIG. 11 as appropriate. Redundant explanation of the above explanation is omitted.

In step S221, operation inputs of the direct selection keys 81 to 84 from the remote controller 4 are received. For example, when the direct selection key 82 is operated, the infrared-signal receiving section 13 receives an operation signal for the direct selection key 82 from the remote controller 4 and communicates the operation signal to the control section 10 of the projector 1.

In step S222, the image source is switched to an image source corresponding to the direct selection key 82. Specifically, the image source is switched to an image source of the BD player coupled to the second HDMI terminal corresponding to the direct selection key 82.

When the direct selection key 81 is operated in step S221, the image source is switched to an image source of the image supply apparatus 2 coupled to the first HDMI terminal. Similarly, when the direct selection key 83 is operated, the image source is switched to an image source of the digital video camera coupled to the third HDMI terminal. When the direct selection key 84 is operated, the image source is switched to an image source of the notebook PC coupled to the VGA terminal.

In step S223, the control section 10 outputs the operation restricting command to the image supply apparatus 2 via the image-information input section 14 according to the CEC of the HDMI. Consequently, the image supply apparatus 2, which receives the operation restricting command, disables operation corresponding to the third key group 63 of the remote controller 4 until the image supply apparatus 2 receives the restriction releasing command.

The operation restricting command is not output in step S223 only when the direct selection key 81 is operated.

As explained above, when the direct selection keys 81 to 84 of the remote controller 4 are operated, the same action effects as the action effects obtained when the source selection key 57 is used can be obtained. Specifically, when sources selected by the operation of the direct selection keys 81 to 84 are the source S1, the operation restricting command is not output. When the selected sources are the sources S2 to S4, the operation restricting command is output. In other words, when the selected sources are the sources S2 to S4, since the condition for starting the first operation is satisfied, the operation restricting command is output. Consequently, it is possible to suppress the image supply apparatus 2 from performing unintended operation. Further, since the source selection image is not displayed and a desired image source can be directly selected, convenience is high.

Operation Form by the AV Mute Key Operation

Figure 15:
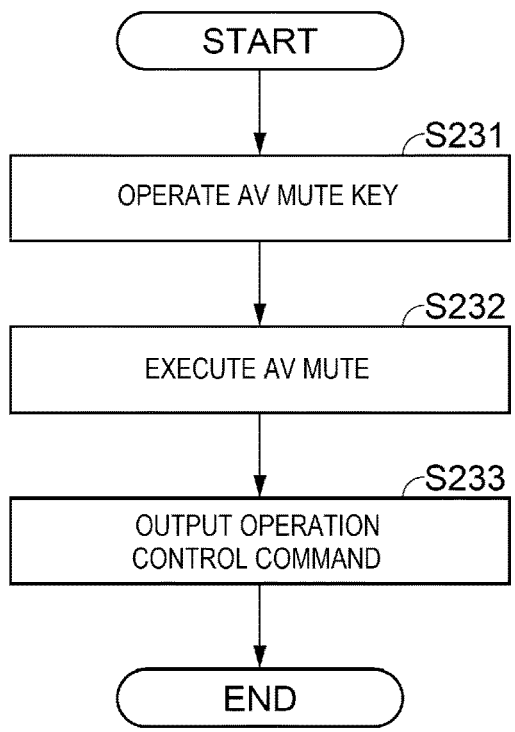
FIG. 15 is a flowchart showing the operation of the projector at the time when the projector executes AV mute.

FIG. 15 is a flowchart showing a flow of processing at the time when AV mute key is operated. The output of the operation restricting command is executed not only when an image source is selected but also when specific operation related to the projector 1 is performed or in a specific state. In other words, the output of the operation restricting command is executed when specific operation not involved in the image supply apparatus 2 and relating to the projector 1 is performed or in a specific state of the projector 1.

In the following explanation, an operation flow of the projector 1 at the time when the AV mute key is pressed is explained mainly with reference to FIG. 15 and with reference to FIG. 11 as appropriate. Redundant explanation of the above explanation is omitted.

In step S231, an operation input of the AV mute key 58 from the remote controller 4 is received. When the AV mute key 58 is operated, the infrared-signal receiving section 13 receives an operation signal of the AV mute key 58 from the remote controller 4 and communicates the operation signal to the control section 10 of the projector 1.

In step S232, the AV mute is executed. Specifically, the projector 1 temporarily stops projection of an image and output of sound and comes into an AV mute state. The AV mute is a function used when the user desires to temporarily stop image projection by the projector 1, for example, when the user desires to stand in front of a screen and give an explanation to participants.

The execution of the AV mute is executed not only when the AV mute key 58 is operated but also when an image source is not supplied for a predetermined time. For example, when an image source is not supplied from the BD player for one hour or more in a state in which the source S2 is selected, the AV mute is automatically executed. The predetermined time is not limited to one hour and can be set as appropriate by the operation section 12 of the projector 1. Even when the source S1 is selected, similarly, the AV mute is executed when an image source is not supplied for the predetermined time.

In step S233, the control section 10 outputs the operation restricting command to the image supply apparatus 2 via the image-information input section 14 according to the CEC of the HDMI. Consequently, the image supply apparatus 2, which receives the operation restricting command, disables operation corresponding to the third key group 63 of the remote controller 4 until the image supply apparatus 2 receives the restriction releasing command.

When the AV mute key 58 is operated again in the AV mute state, the control section 10 resumes the projection of the image and the sound output. At the same time, the control section 10 outputs the restriction releasing command to the image supply apparatus 2.

As explained above, when the AV mute is executed, the operation restricting command is also output when any one of the sources S1 to S4 is selected. Consequently, it is possible to suppress the image supply apparatus 2 from performing unintended operation.

Operation Form at the Time when Specific Processing Occurs

When specific processing related to the projector 1 occurs, the operation restricting command may be output even if an operation key is not operated. The restriction releasing command may be output when the processing ends. For example, in first use of the projector 1, when an initial setting screen is displayed, the operation restricting command is output to the image supply apparatus 2 according to the display of the initial setting screen. When the initial setting ends, the restriction releasing command is output to the image supply apparatus 2. This is the same as when the abnormality informing message is displayed in case of the occurrence of an abnormality in the projector 1.

Since the operation restricting command is output in the specific state of the projector 1 in this way, it is possible to suppress the image supply apparatus 2 from performing unintended operation.

Contents derived from the embodiment are explained below.

An image display system is an image display system including: an image supply apparatus configured to supply image information; an image display apparatus configured to display an image based on the image information supplied from the image supply apparatus; and a remote controller configured to remotely operate the image supply apparatus and the image display apparatus. The remote controller includes: a first operation key, a second operation key, and a third operation key; a first transmitting section configured to transmit a first operation signal; a second transmitting section configured to transmit a second operation signal in a communication scheme different from a communication scheme for the first operation signal; and a remote-controller control section configured to, when the first operation key is operated, cause the first transmitting section to transmit the first operation signal, when the second operation key is operated, cause the second transmitting section to transmit the second operation signal, and, when the third operation key is operated, cause the first transmitting section to transmit the first operation signal and cause the second transmitting section to transmit the second operation signal. The image display apparatus includes: a first input and output section coupled to the image supply apparatus; a first receiving section configured to receive the first operation signal; and a first control section configured to perform control corresponding to the first operation signal received by the first receiving section. The image supply apparatus includes: a second input and output section coupled to the image display apparatus; a second receiving section configured to receive the second operation signal; and a second control section configured to perform control corresponding to the second operation signal received by the second receiving section. The first control section performs, when a condition for starting first operation is satisfied, control for starting the first operation and output of a first command to the image display apparatus and performs, when a condition for ending the first operation is satisfied after the first control section outputs the first command, control for ending the first operation and output of a second command to the image supply apparatus. The second control section stops, from when the first command is input until when the second command is input, control corresponding to the second operation signal transmitted when the third operation key is operated.

With this configuration, the image supply apparatus stops, from when the first command is input until when the second command is input, the control based on the second operation signal transmitted when the third operation key is operated. Accordingly, even if the third operation key is operated in relation to the first operation while the image display apparatus is performing the first operation, the operation is disabled and the image supply apparatus is suppressed from performing unintended operation.

In the image display system, the condition for starting the first operation may be a condition that the first operation signal received by the first receiving section indicates the start of the first operation.

With this configuration, when the first receiving section receives, from the remote controller, the first operation signal indicating the start of the first operation, the first control section outputs the first command. Therefore, it is possible to disable the operation of the third operation key at timing corresponding to an instruction of a user.

In the image display system, the condition for ending the first operation may be a condition that the first operation signal received by the first receiving section indicates the end of the first operation.

With this configuration, when the first receiving section receives, from the remote controller, the first operation signal indicating the end of the first operation, the first control section outputs the second command. Therefore, it is possible to disable the operation of the third operation key in a period corresponding to an instruction of the user.

In the image display system, the condition for ending the first operation may be a condition that a time in which the first operation signal is not received by the first receiving section reaches a predetermined time.

With this configuration, when the time in which the first operation signal is not received reaches the predetermined time, the first control section outputs the second command. Therefore, a period in which the operation of the third operation key is disabled is suppressed from being uselessly extended.

In the image display system, the first operation may be display of a menu image for performing setting of the image display apparatus.

With this configuration, while the image display apparatus is displaying the menu image, the operation of the third operation key is disabled in the image supply apparatus. Therefore, the image supply apparatus is suppressed from performing unintended operation according to operation for the menu image.

In the image display system, the first operation may be display of an image including a message indicating a state of the image display apparatus.

With this configuration, while the state of the image display apparatus is notified to the user, the operation of the third operation key is disabled. Therefore, the image supply apparatus is suppressed from performing unintended operation.

In the image display system, the first operation signal may be an infrared operation signal, and the second operation signal may be a Bluetooth operation signal.

With this configuration, when the image display apparatus is operated using a remote controller capable of transmitting both of the infrared signal and the Bluetooth signal, the image supply apparatus is suppressed from performing unintended operation.

A control method for an image display system according to an aspect of the present disclosure is a control method for an image display system including: an image supply apparatus configured to supply image information; an image display apparatus configured to display an image based on the image information supplied from the image supply apparatus; and a remote controller configured to remotely operate the image supply apparatus and the image display apparatus, the control method including: the remote controller transmitting a first operation signal when a first operation key included in the remote controller is operated; the remote controller transmitting a second operation signal in a communication scheme different from a communication scheme for the first operation signal when a second operation key included in the remote controller is operated; the remote controller performing the transmission of the first operation signal and the transmission of the second operation signal when a third operation key included in the remote controller is operated; the image display apparatus receiving the first operation signal and performing control corresponding to the first operation signal; the image supply apparatus receiving the second operation signal and performing control corresponding to the second operation signal; the image display apparatus performing control for starting the first operation and output of a first command to the image supply apparatus when a condition for starting the first operation is satisfied; the image display apparatus performing control for ending the first operation and output of a second command to the image supply apparatus when a condition for ending the first operation is satisfied after the first command is output; and the image supply apparatus stopping, from when the first command is input until when the second command is input, control corresponding to the second operation signal transmitted when the third operation key is operated.

With the control method, the image supply apparatus stops, from when the first command is input until when the second command is input, the control based on the second operation signal transmitted when the third operation key is operated. Accordingly, even if the third operation key is operated in relation to the first operation while the image display apparatus is performing the first operation, the operation is disabled and the image supply apparatus is suppressed from performing unintended operation.

An image display system is an image display system including: an image supply apparatus configured to supply image information; an image display apparatus configured to display an image based on the image information supplied from the image supply apparatus; and a remote controller configured to remotely operate the image supply apparatus and the image display apparatus. The remote controller includes: a first operation key, a second operation key, and a third operation key; a first transmitting section configured to transmit a first operation signal; a second transmitting section configured to transmit a second operation signal in a communication scheme different from a communication scheme for the first operation signal; and a remote-controller control section configured to, when the first operation key is operated, cause the first transmitting section to transmit the first operation signal, when the second operation key is operated, cause the second transmitting section to transmit the second operation signal, and, when the third operation key is operated, cause the first transmitting section to transmit the first operation signal and cause the second transmitting section to transmit the second operation signal. The image display apparatus includes: a first input and output section coupled to the image supply apparatus; a first receiving section configured to receive the first operation signal; and a first control section configured to perform control corresponding to the first operation signal received by the first receiving section. The image supply apparatus includes: a second input and output section coupled to the image display apparatus; a second receiving section configured to receive the second operation signal; and a second control section configured to perform control corresponding to the second operation signal received by the second receiving section. The first control section performs output of a first command to the image supply apparatus when operation for changing the image display apparatus from a first state in which the image information supplied from the image supply apparatus is used to a second state in which the image information supplied from the image supply apparatus is not used is performed and performs output of a second command to the image supply apparatus when operation for changing the image display apparatus from the second state to the first state is performed. The second control section stops, from when the first command is input until when the second command is input, control corresponding to the second operation signal transmitted when the third operation key is operated.

With this configuration, the image supply apparatus stops, from when the first command is input until when the second command is input, the control based on the second operation signal transmitted when the third operation key is operated. Specifically, since the first command is output when the operation for changing the image display apparatus to the second state in which the image information supplied from the image supply apparatus is not used is performed, thereafter, even if the third operation key is operated, the operation is disabled and the image supply apparatus is suppressed from performing unintended operation. In other words, when specific operation not involved in the image supply apparatus and relating to the image display apparatus is performed, by outputting the first command, it is possible to suppress the image supply apparatus from performing unintended operation.

What is claimed is:

1. An image display system comprising:
   an image supply apparatus configured to supply image information;
   an image display apparatus configured to display an image based on the image information supplied from the image supply apparatus; and
   a remote controller configured to remotely operate the image supply apparatus and the image display apparatus, wherein
   the remote controller includes:
      a first operation key, a second operation key, and a third operation key;
      a first transmitting section configured to transmit a first operation signal via infrared communication;
      a second transmitting section configured to transmit a second operation signal via Bluetooth communication; and
      a remote-controller control section configured to, when the first operation key is operated, cause the first transmitting section to transmit the first operation signal, when the second operation key is operated, cause the second transmitting section to transmit the second operation signal, and, when the third operation key is operated, cause the first transmitting section to transmit the first operation signal and cause the second transmitting section to transmit the second operation signal,
   the image display apparatus includes:
      a first input and output section coupled to the image supply apparatus;
      a first receiving section configured to receive the first operation signal; and
      a first control section configured to perform control corresponding to the first operation signal received by the first receiving section,
   the image supply apparatus includes:
      a second input and output section coupled to the image display apparatus;
      a second receiving section configured to receive the second operation signal; and
      a second control section configured to perform control corresponding to the second operation signal received by the second receiving section,
   the first control section performs, when a condition for starting first operation is satisfied, control for starting the first operation and output of a first command to the image supply apparatus and performs, when a condition for ending the first operation is satisfied after the first control section outputs the first command, control for ending the first operation and output of a second command to the image supply apparatus, and
   the second control section stops, from when the first command is input until when the second command is input, control corresponding to the second operation signal transmitted when the third operation key is operated.

2. The image display system according to claim 1, wherein the condition for starting the first operation is a condition that the first operation signal received by the first receiving section indicates the start of the first operation.

3. The image display system according to claim 1, wherein the condition for ending the first operation is a condition that the first operation signal received by the first receiving section indicates the end of the first operation.

4. The image display system according to claim 1, wherein the condition for ending the first operation is a condition that a time in which the first operation signal is not received by the first receiving section reaches a predetermined time.

5. The image display system according to claim 1, wherein the first operation is display of a menu image for performing setting of the image display apparatus.

6. The image display system according to claim 1, wherein the first operation is display of an image including a message indicating a state of the image display apparatus.

7. A control method for an image display system including: an image supply apparatus configured to supply image information; an image display apparatus configured to display an image based on the image information supplied from the image supply apparatus; and a remote controller configured to remotely operate the image supply apparatus and the image display apparatus, the control method comprising:

the remote controller transmitting a first operation signal infrared communication when a first operation key included in the remote controller is operated;

the remote controller transmitting a second operation signal via Bluetooth communication when a second operation key included in the remote controller is operated;

the remote controller performing the transmission of the first operation signal and the transmission of the second operation signal when a third operation key included in the remote controller is operated;

the image display apparatus receiving the first operation signal and performing control corresponding to the first operation signal;

the image supply apparatus receiving the second operation signal and performing control corresponding to the second operation signal;

the image display apparatus performing control for starting the first operation and output of a first command to the image supply apparatus when a condition for starting the first operation is satisfied;

the image display apparatus performing control for ending the first operation and output of a second command to the image supply apparatus when a condition for ending the first operation is satisfied after the first command is output; and the image supply apparatus stopping, from when the first command is input until when the second command is input, control corresponding to the second operation signal transmitted when the third operation key is operated.

8. An image display system comprising:

an image supply apparatus configured to supply image information;

an image display apparatus configured to display an image based on the image information supplied from the image supply apparatus; and a remote controller configured to remotely operate the image supply apparatus and the image display apparatus, wherein the remote controller includes:
- a first operation key, a second operation key, and a third operation key;
- a first transmitting section configured to transmit a first operation signal via infrared communication;
- a second transmitting section configured to transmit a second operation signal via Bluetooth communication; and
- a remote-controller control section configured to, when the first operation key is operated, cause the first transmitting section to transmit the first operation signal, when the second operation key is operated, cause the second transmitting section to transmit the second operation signal, and, when the third operation key is operated, cause the first transmitting section to transmit the first operation signal and cause the second transmitting section to transmit the second operation signal, the image display apparatus includes:
- a first input and output section coupled to the image supply apparatus;
- a first receiving section configured to receive the first operation signal; and
- a first control section configured to perform control corresponding to the first operation signal received by the first receiving section, the image supply apparatus includes:
- a second input and output section coupled to the image display apparatus;
- a second receiving section configured to receive the second operation signal; and
- a second control section configured to perform control corresponding to the second operation signal received by the second receiving section, the first control section performs output of a first command to the image supply apparatus when operation for changing the image display apparatus from a first state in which the image information supplied from the image supply apparatus is used to a second state in which the image information supplied from the image supply apparatus is not used is performed and performs output of a second command to the image supply apparatus when operation for changing the image display apparatus from the second state to the first state is performed, and the second control section stops, from when the first command is input until when the second command is input, control corresponding to the second operation signal transmitted when the third operation key is operated.

* * * * *